(12) United States Patent
Yoon et al.

(10) Patent No.: US 12,279,030 B2
(45) Date of Patent: Apr. 15, 2025

(54) ELECTRONIC DEVICE INCLUDING CAMERA AND METHOD FOR OPERATING THE SAME

(71) Applicant: Samsung Electronics Co., Ltd., Suwon-si (KR)

(72) Inventors: Heewoong Yoon, Suwon-si (KR); Jeongho Cho, Suwon-si (KR); Jongah Kim, Suwon-si (KR); Kihyuk Lee, Suwon-si (KR); Donghan Lee, Suwon-si (KR); Seungyun Lee, Suwon-si (KR); Gwangho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 17/945,669

(22) Filed: Sep. 15, 2022

(65) Prior Publication Data

US 2023/0082406 A1    Mar. 16, 2023

Related U.S. Application Data

(63) Continuation of application No. PCT/KR2022/012545, filed on Aug. 22, 2022.

(30) Foreign Application Priority Data

Sep. 16, 2021 (KR) .................. 10-2021-0123790

(51) Int. Cl.
*H04N 23/54* (2023.01)
*H04M 1/02* (2006.01)
*H04N 23/55* (2023.01)

(52) U.S. Cl.
CPC .......... *H04N 23/54* (2023.01); *H04M 1/0264* (2013.01); *H04N 23/55* (2023.01); *H04M 2250/52* (2013.01)

(58) Field of Classification Search
CPC ........ H04N 23/54; H04N 23/55; H04N 23/57; H04N 23/60; H04N 25/53; H04N 7/142;
(Continued)

(56) References Cited

U.S. PATENT DOCUMENTS 11,115,596 B2    9/2021  Chu et al.
2008/0165267 A1*  7/2008  Cok ...................... H04N 7/144
                                                      348/E5.022
(Continued)

FOREIGN PATENT DOCUMENTS

CN    106657485 A    5/2017
CN    106843398 A    6/2017
(Continued)

OTHER PUBLICATIONS

International Search Report dated Nov. 21, 2022, issued in International Patent Application No. PCT/KR2022/012545.
(Continued)

*Primary Examiner* — Timothy J Henn
(74) *Attorney, Agent, or Firm* — Jefferson IP Law, LLP

(57) ABSTRACT

An electronic device is provided. The electronic device includes a display, a first module for an operation of a camera and an operation of an optical sensor disposed under the display, and at least one processor. The first module may include an image sensor, an infrared filter, and the optical sensor disposed close to the image sensor and inside an area of the infrared filter. The at least one processor may be configured to separate a time to output one frame into a first time period for the operation of the camera and a second time period for the operation of the optical sensor, perform the operation of the camera in the first time period using the first module, and perform the operation of the optical sensor in the second time period using the first module.

20 Claims, 16 Drawing Sheets

(58) Field of Classification Search
CPC ........ H04N 23/11; H04N 23/13; H04N 23/20;
H04N 23/50; H04M 1/0264; H04M
2250/52; H04M 1/0266; H04M 2250/12;
H04M 1/026
See application file for complete search history.

(56) References Cited

U.S. PATENT DOCUMENTS

| | | | |
|---|---|---|---|
| 2010/0200752 A1 | 8/2010 | Lee et al. | |
| 2010/0314543 A1* | 12/2010 | Lee | G01J 3/0278 |
| | | | 250/330 |
| 2015/0245767 A1* | 9/2015 | Northcott | G06V 10/143 |
| | | | 351/206 |
| 2016/0119522 A1 | 4/2016 | Choi et al. | |
| 2017/0235398 A1 | 8/2017 | Choi et al. | |
| 2019/0149791 A1 | 5/2019 | Lee | |
| 2019/0394316 A1 | 12/2019 | Zhang | |
| 2020/0228689 A1 | 7/2020 | Kim et al. | |
| 2020/0234659 A1 | 7/2020 | Ju et al. | |
| 2020/0242985 A1 | 7/2020 | Cho et al. | |
| 2021/0202915 A1 | 7/2021 | Kim et al. | |
| 2022/0075225 A1 | 3/2022 | Lim et al. | |

FOREIGN PATENT DOCUMENTS

| | | | |
|---|---|---|---|
| JP | 2016-226015 A | 12/2016 | |
| KR | 10-2009-0122805 A | 12/2009 | |
| KR | 10-2016-0048552 A | 5/2016 | |
| KR | 10-2017-0096565 A | 8/2017 | |
| KR | 10-2019-0032101 A | 3/2019 | |
| KR | 10-2020-0089593 A | 7/2020 | |
| KR | 10-2020-0093916 A | 8/2020 | |
| KR | 10-2021-0043887 A | 4/2021 | |
| KR | 10-2021-0084879 A | 7/2021 | |
| WO | 2020-218842 A1 | 10/2020 | |
| WO | 2021/106513 A1 | 6/2021 | |

OTHER PUBLICATIONS

European Search Report dated Sep. 19, 2024, issued in European Application No. 22870158.7.

* cited by examiner

ELECTRONIC DEVICE INCLUDING CAMERA AND METHOD FOR OPERATING THE SAME

CROSS-REFERENCE TO RELATED APPLICATION(S)

This application is a continuation application, claiming priority under § 365(c), of an International application No. PCT/KR2022/012545, filed on Aug. 22, 2022, which is based on and claims the benefit of a Korean patent application number 10-2021-0123790, filed on Sep. 16, 2021, in the Korean Intellectual Property Office, the disclosure of which is incorporated by reference herein in its entirety.

TECHNICAL FIELD

The disclosure relates to an electronic device including a camera and a method for operating the same. More particularly, the disclosure relates to method for performing the operation of the camera and the operation of the optical sensor using one module in an electronic device.

BACKGROUND ART

Advancing information communication technologies and semiconductor technologies accelerate the spread and use of various electronic devices. More particularly, recent electronic devices may perform communication while being carried and may include one or more sensors for obtaining various types of ambient information. A sensor in an electronic device may obtain various pieces of information. There may be a diversity of types of sensors depending on information to be obtained.

Among the sensors of the electronic device, a camera sensor, an ultra violet (UV) sensor, an iris sensor, a spectroscopic sensor, an optical sensor, infrared (IR) sensor, proximity sensor, and gesture sensor, a red green blue (RGB) sensor, and/or an illuminance sensor (or an ambient light sensor (ALS)) uses light.

The optical sensor (e.g., an IR sensor, a proximity sensor, and a gesture sensor) is a sensor that includes a light emitting unit and a light receiving unit and may measure whether there is a target object or whether a target object is near or far from the electronic device by measuring the amount of the light that is emitted from the light emitting unit (LED) and is reflected by the target object to the light receiving unit. The optical sensor is typically disposed in the bezel portion of the electronic device. Recently, however, as the bezel portion is shrunken while the display is enlarged, the optical sensor is placed under the display.

The above information is presented as background information only to assist with an understanding of the disclosure. No determination has been made, and no assertion is made, as to whether any of the above might be applicable as prior art with regard to the disclosure.

DISCLOSURE

Technical Problem

While the predetermined area of the bezel, where the optical sensor is disposed, has a transmittance of 20%, the predetermined area of the display, under which the optical sensor is disposed, has a transmittance of about 2-3%, which merely amounts to about 10% of the transmittance of the predetermined area of the bezel. As such, when the optical sensor is disposed under the predetermined area of the display, degradation of transmittance occurs. Further, the deviation in the transmittance of the display increases to about ±50% depending on the processing deviation in display, and so does the deviation in recognition of the target object by the electronic device.

Further, since the camera module is disposed under the display, placing the optical sensor together with the camera module under the display may occupy more space.

Aspects of the disclosure are to address at least the above-mentioned problems and/or disadvantages and to provide at least the advantages described below. Accordingly, an aspect of the disclosure is to provide a method for performing the operation of the camera and the operation of the optical sensor using one module in an electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device comprises a display, a first module for an operation of a camera and an operation of an optical sensor disposed under the display, and at least one processor. The first module may include an image sensor, an infrared filter, and the optical sensor disposed close to the image sensor and inside an area of the infrared filter. The at least one processor may be configured to separate a time to output one frame into a first time period for the operation of the camera and a second time period for the operation of the optical sensor, perform the operation of the camera in the first time period using the first module, and perform the operation of the optical sensor in the second time period using the first module.

In accordance with another aspect of the disclosure, a method for performing an operation of a camera and an operation of an optical sensor using one module in an electronic device is provided. The method comprises dividing a time to output one frame into a first time period for the operation of the camera and a second time period for the operation of the optical sensor, performing the operation of the camera in the first time period using a first module of the electronic device, and performing the operation of the optical sensor in the second time period using the first module. The first module may include an image sensor, an infrared filter, and the optical sensor disposed close to the image sensor and inside an area of the infrared filter.

Advantageous Effects

According to various embodiments of the disclosure, it is possible to provide advantages in view of use of the space of an electronic device 501 by performing the operation of the camera and the operation of the optical sensor using one module in the electronic device.

The transmittance for the operation of the camera needs to be higher than the transmittance for the operation of the optical sensor. The electronic device may recognize the target object at a higher transmittance than the transmittance of the optical sensor by performing the operation of the camera and the operation of the optical sensor using one module in the electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
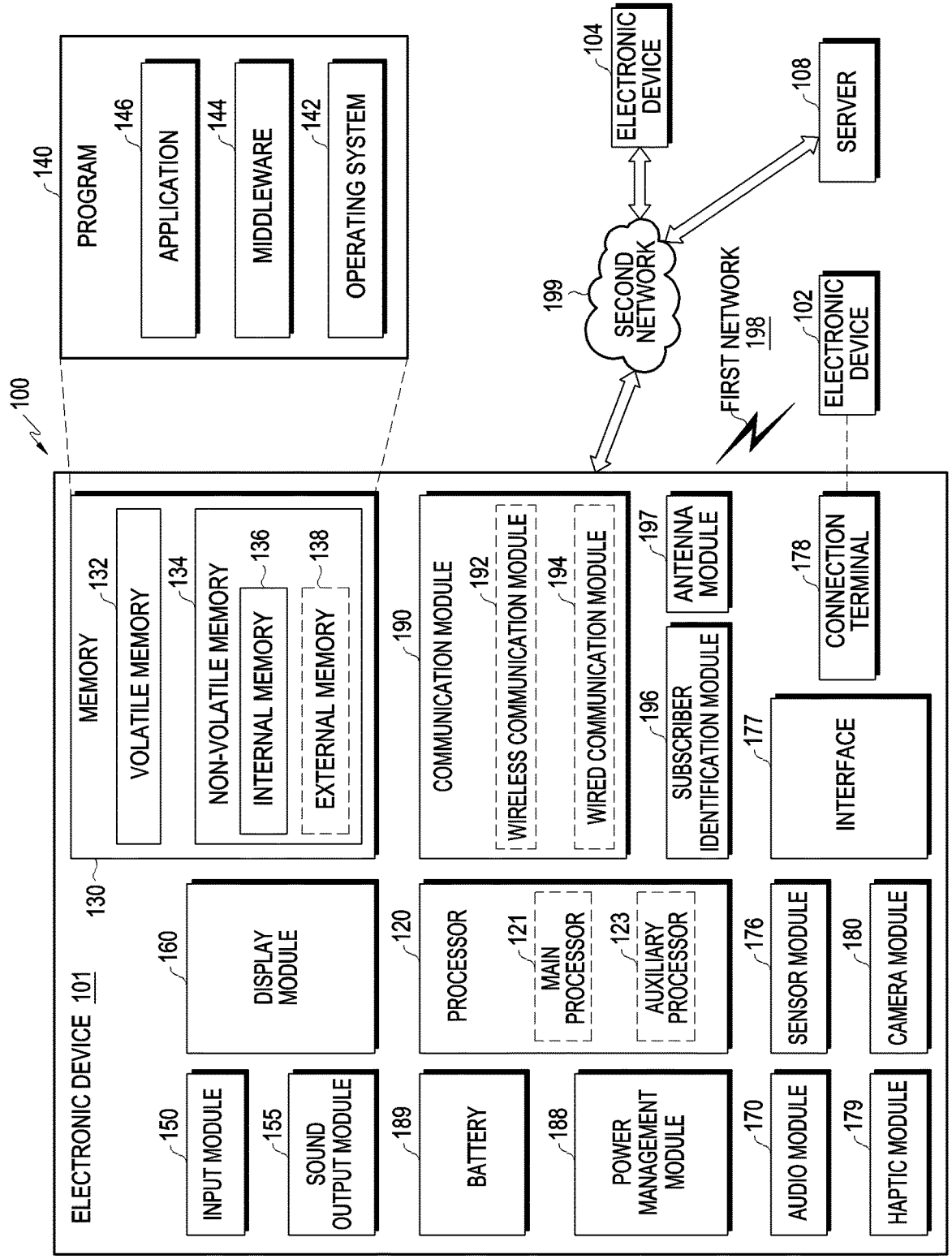
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, am electronic device 101 in a network environment 100 may communicate with at least one of an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5' generation (5G) network, a next-generation communication network, the Internet, or a computer network (e.g., a local area network (LAN) or a wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductor or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
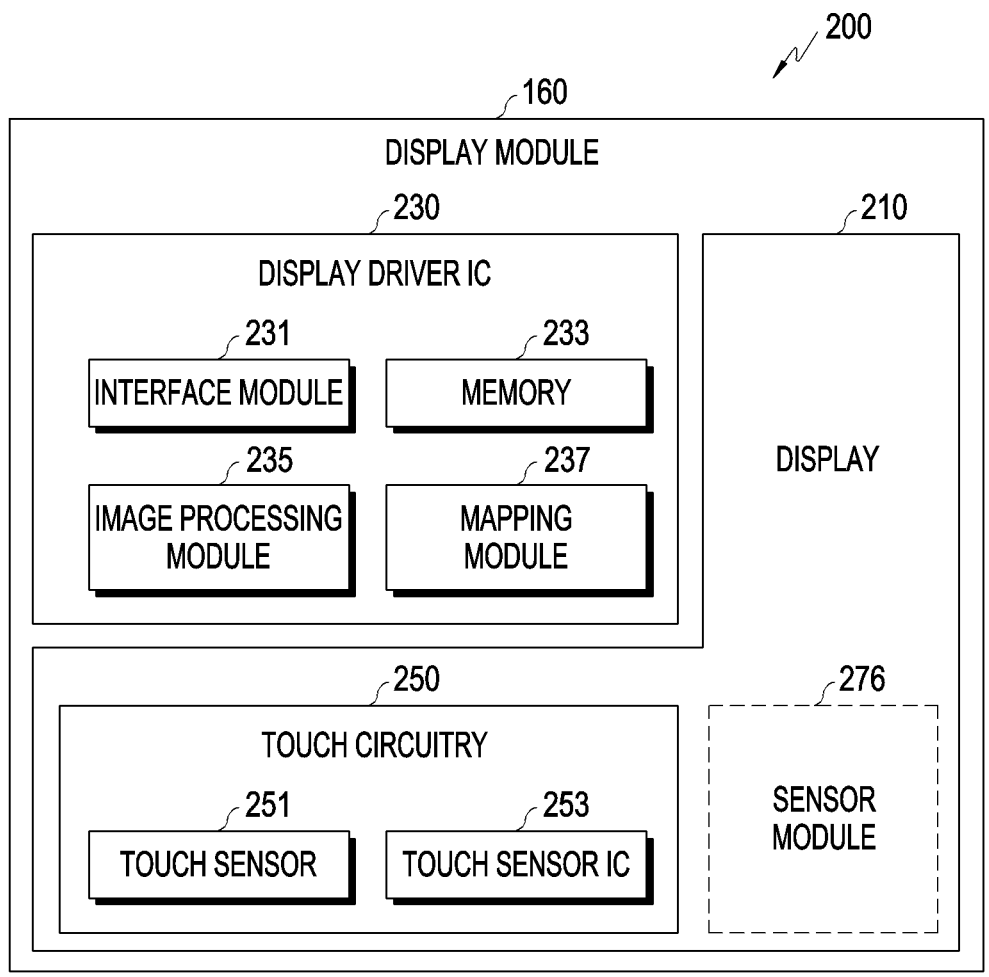
FIG. 2 is a block diagram illustrating a display device according to an embodiment of the disclosure.

FIG. 2 is a block diagram 200 illustrating a display module 160 according to an embodiment of the disclosure.

Referring to FIG. 2, the display module 160 may include a display 210 and a display driver integrated circuit (DDI) 230 to control the display 110. The DDI 230 may include an interface module 231, a memory 233 (e.g., buffer memory), an image processing module 235, or a mapping module 237. The DDI 230 may receive image information that contains image data or an image control signal corresponding to a command to control the image data from another component of the electronic device 101 via the interface module 231.

For example, according to an embodiment of the disclosure, image information may be received from a processor (e.g., the processor 120 of FIG. 1 (e.g., the main processor 121 of FIG. 1) (e.g., an application processor)) or an auxiliary processor (e.g., the auxiliary processor 123 of FIG. 1 (e.g., a graphic processing device)) operated independently from the function of the main processor (e.g., the main processor 121 of FIG. 1). The DDI 230 may communicate, for example, with a touch circuitry 250 or the sensor module 276 (e.g., the sensor module 176 of FIG. 1) via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235.

According to an embodiment of the disclosure, at least some of the operations performed by the DDI 230 may be equally performed by the processor (e.g., the processor 120 of FIG. 1).

According to an embodiment of the disclosure, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment of the disclosure, the display module 160 may further include the touch circuitry 250. The touch circuitry 250 may include a touch sensor 251 and a touch sensor IC 253 to control the touch sensor 151. The touch sensor IC 253 may control the touch sensor 251 to detect a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to the certain position on the display 210. The touch sensor IC 253 may provide input information (e.g., a position, an area, a pressure, or a time) indicative of the touch input or the hovering input detected to the processor (e.g., the processor 120 of FIG. 1). According to an embodiment of the disclosure, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment of the disclosure, the display module 160 may further include at least one sensor (e.g., a fingerprint sensor, an iris sensor, a pressure sensor, or an illuminance sensor) of the sensor module 276 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 276 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display module 160 includes a pressure sensor, the pressure sensor may obtain pressure information corresponding to a touch input received via a partial or whole area of the display 210. According to an embodiment of the disclosure, the touch sensor 251 or the sensor module 276 may be disposed between pixels in a pixel layer of the display 210, or over or under the pixel layer.

Figure 3A:
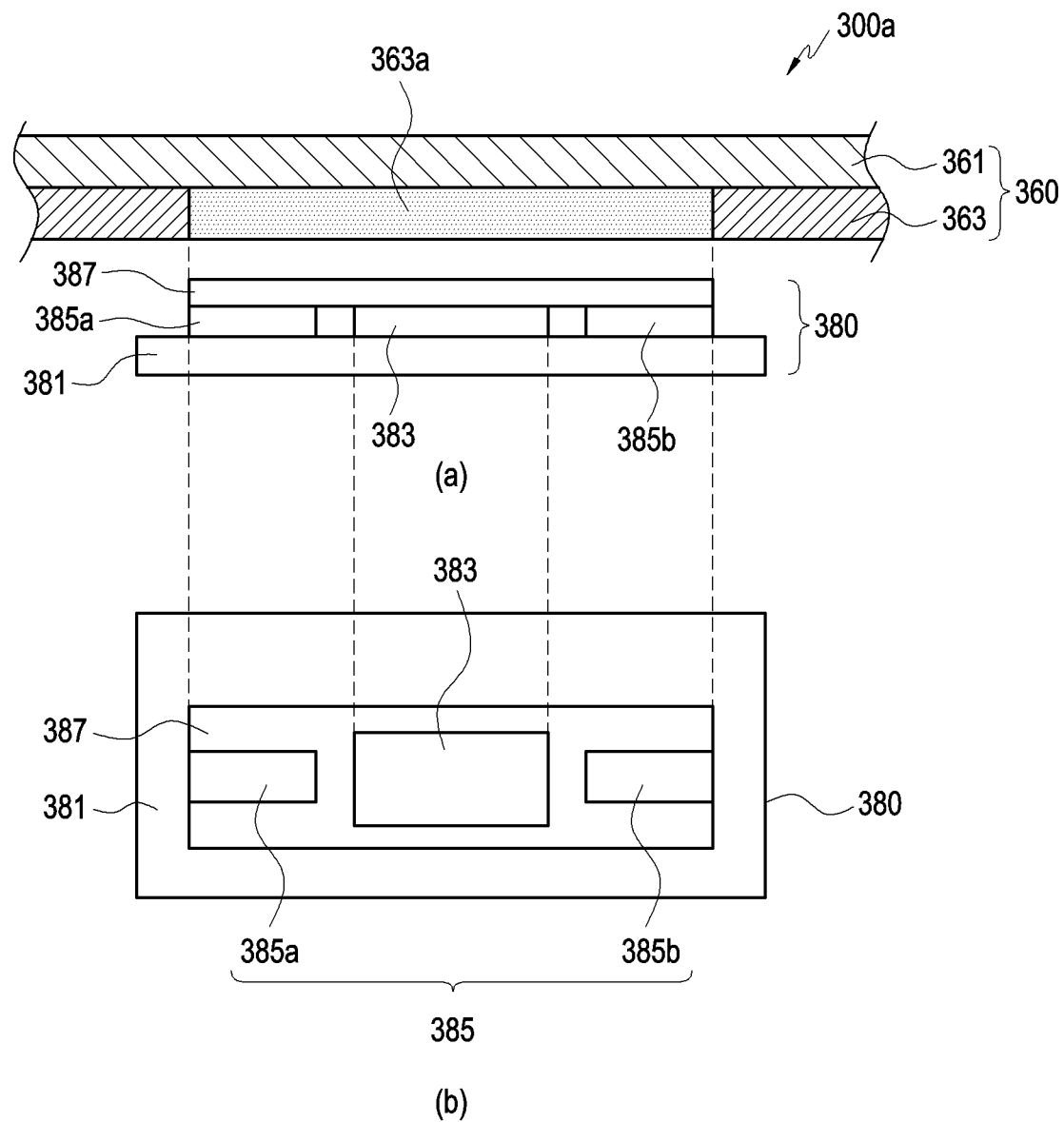
FIGS. 3A, 3B, 3C, and 3D are views illustrating a structure of a first module according to various embodiments of the disclosure.
Figure 3B:
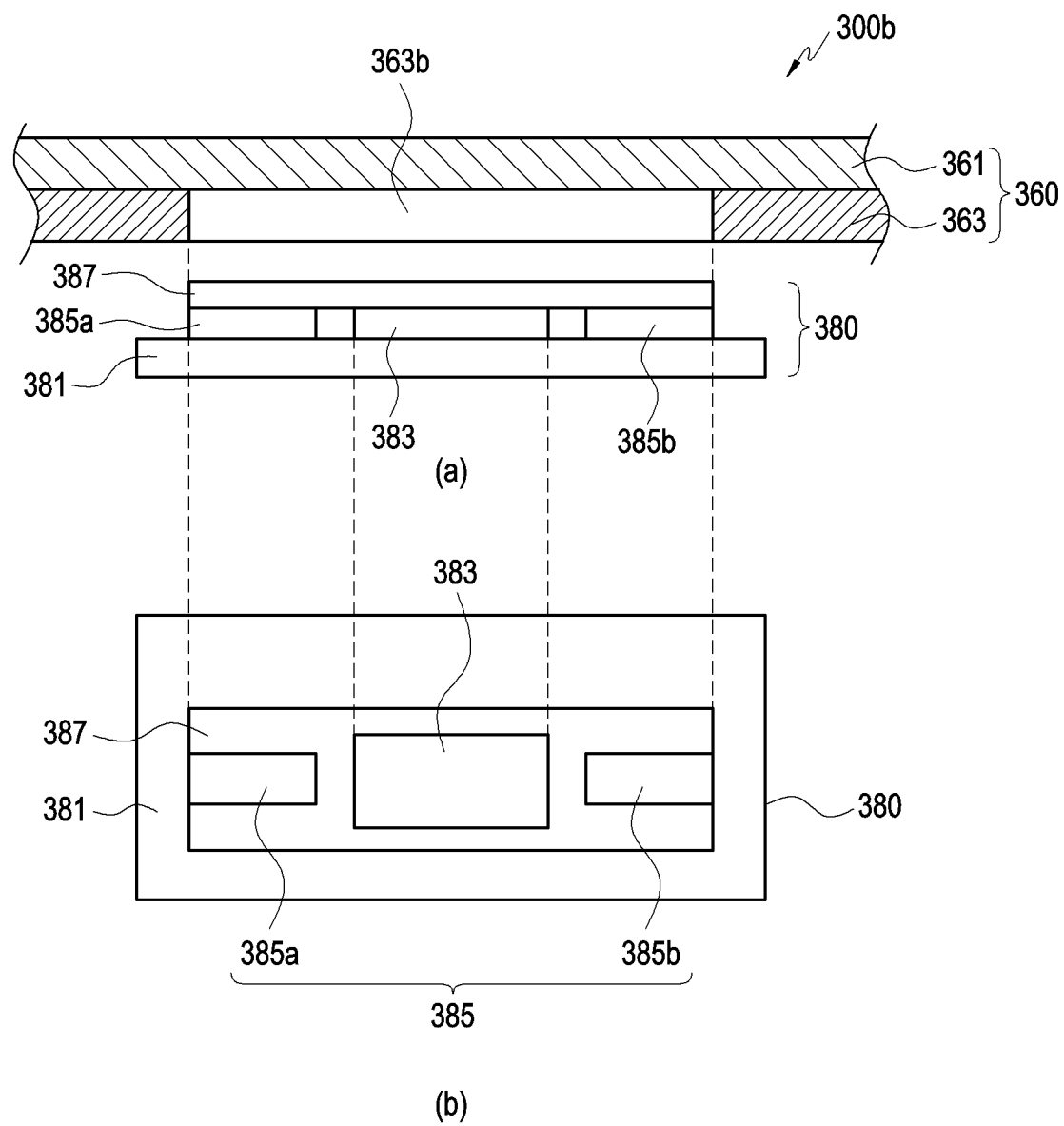
Figure 3C:
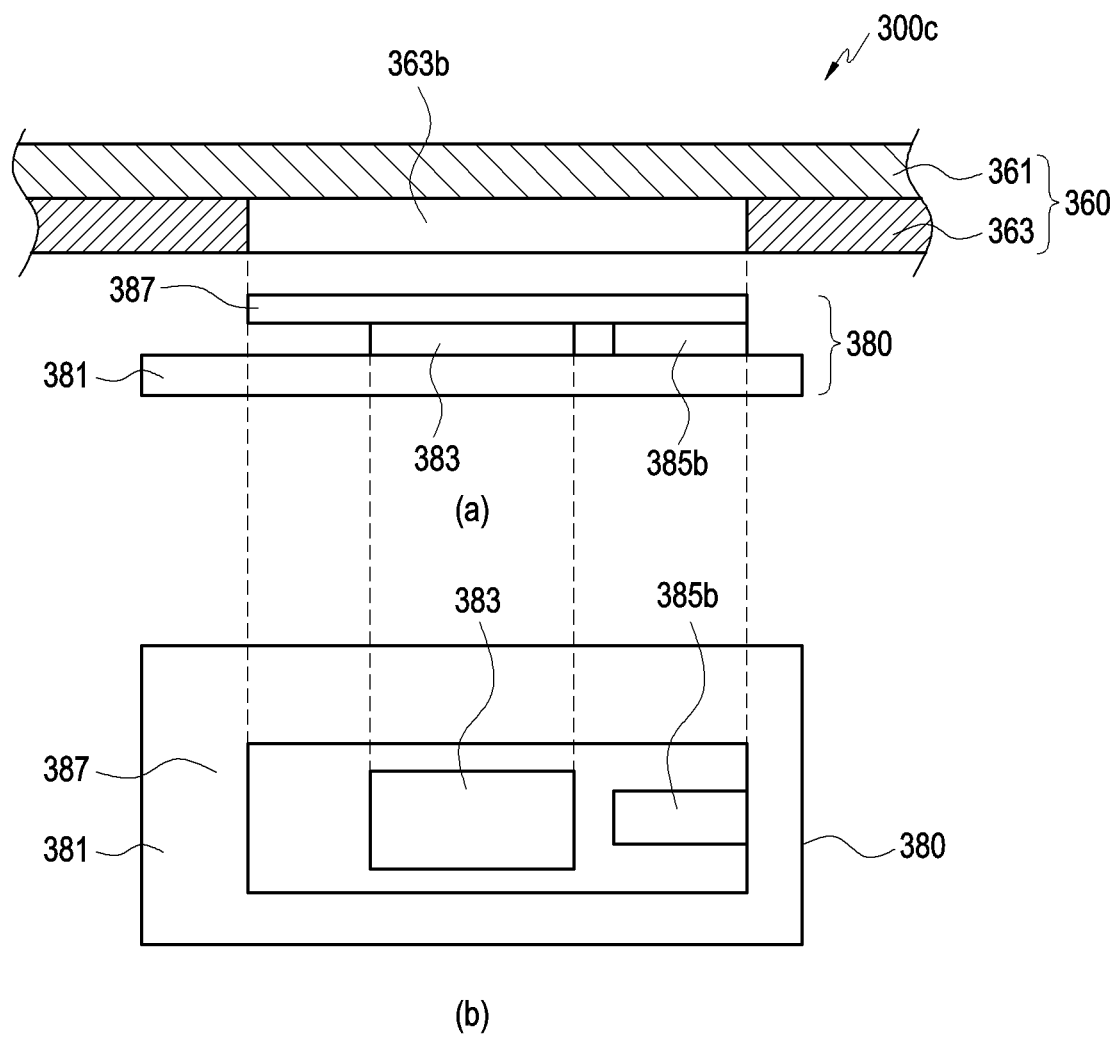
Figure 3D:
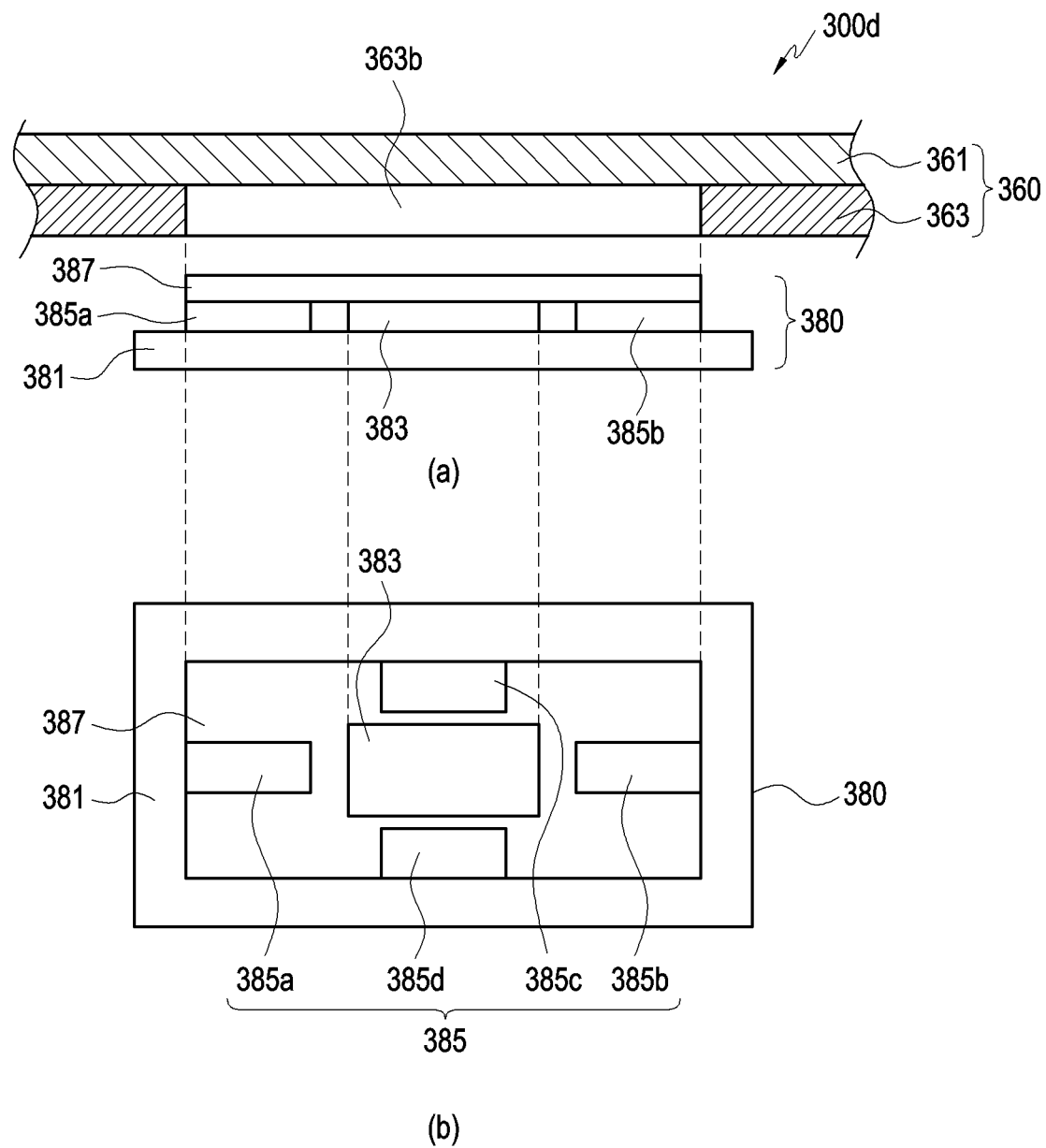
Figure 4:
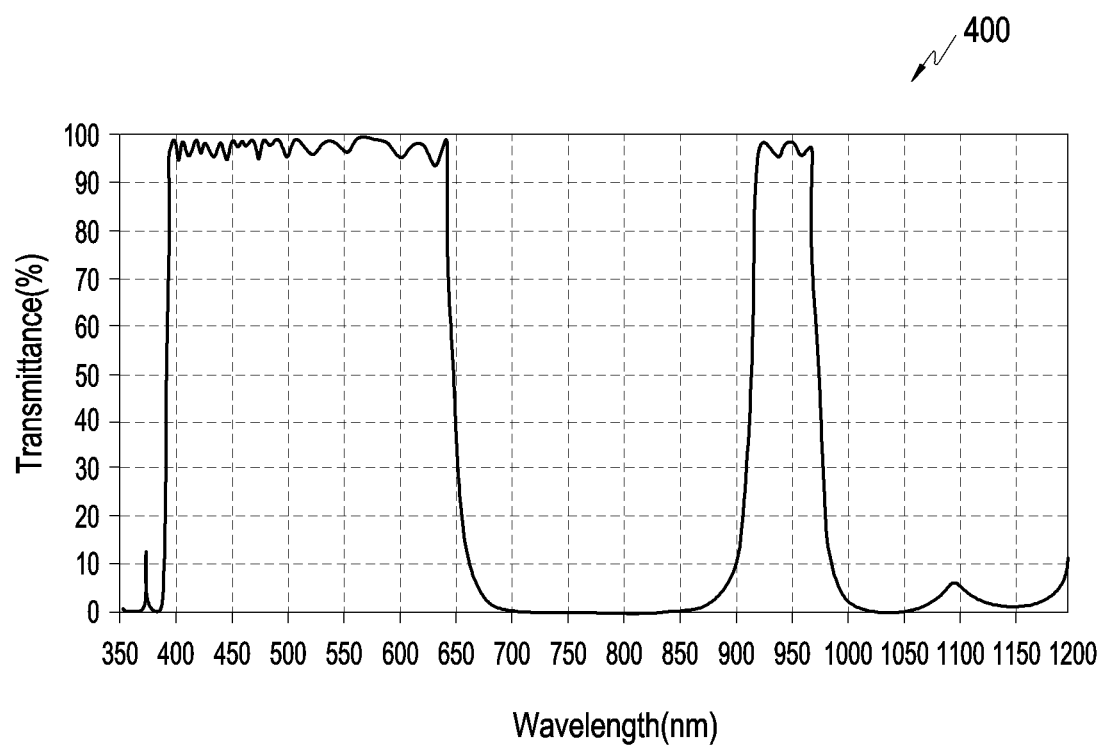
FIG. 4 is a view illustrating an infrared filter according to an embodiment of the disclosure.

FIGS. 3A, 3B, 3C, and 3D are views 300a to 300d illustrating a structure of a first module according to various embodiments of the disclosure, and FIG. 4 is a view 400 illustrating an infrared filter according to an embodiment of the disclosure.

Part (a) of FIG. 3A is a side view illustrating a first module 380 disposed under the display 360, and part (b) of FIG. 3A is a front view illustrating the first module 380.

Referring to FIG. 3A, the first module 380 for the operation of the camera and the operation of the optical sensor may be disposed under the display 360 (e.g., the display module 160 of FIG. 1) of the electronic device (e.g., the electronic device 101 of FIG. 1). The first module 380 may be disposed under a display panel 363, of a window 361 and the display panel 363 included in the display 360, and the transmittance of a partial area 363a corresponding to the position where the first module 380 is disposed in the display panel 363 may be set to a transmittance at which the operation of the camera and the operation of the optical sensor are possible. For example, the transmittance of the predetermined area 363a may be set to about 20-30%.

According to various embodiments of the disclosure, the first module 380 may include a PCB 381, an image sensor 383, an optical sensor 385, and an infrared filter 387.

The image sensor 383 may convert the light received through a lens into a digital signal, for the operation of the camera, and output it as image data. The image sensor 383 may include RGB pixels to absorb each corresponding wavelength band of light and output it as a digital signal.

The optical sensor 385 may include a light emitting unit 385a (e.g., an IR LED or vertical cavity surface emitting laser (VCSEL)) and a light receiving unit 385b. The light receiving unit 385b may include a photodiode. The light emitting unit 385a and light receiving unit 385b of the optical sensor 385 may be close to the image sensor 383 and may be disposed inside the area of the infrared filter 387 so as not to depart from the area of the infrared filter 387. As the optical sensor 385 is close to the image sensor 383 and is disposed inside the area of the infrared filter 387 so as not to depart from the area of the infrared filter 387, it is possible to reduce the size of the first module 380 and hence save costs.

The infrared filter 387 may be designed to block the infrared light received through the infrared wavelength band upon receiving the image data through the image sensor 383 for the operation of the camera and transmit the infrared light through a partial infrared wavelength band of the infrared wavelength band blocked for the operation of the camera, for the operation of the optical sensor.

Referring to FIG. 4, the infrared filter 387 may transmit infrared light through a wavelength band of about 400 to 700 nm and a wavelength band of about 900 to 1000 nm. The infrared filter 387 may be designed to transmit the infrared light through a wavelength band of about 900 to 1000 nm, which is a partial wavelength band of the infrared wavelength band blocked for the operation of the camera.

Part (a) of FIG. 3B is a side view illustrating a first module 380 disposed under the display 360, and part (b) of FIG. 3B is a front view illustrating the first module 380.

Referring to FIG. 3B, the first module 380 for the operation of the camera and the operation of the optical sensor may be disposed under the display 360 (e.g., the display module 160 of FIG. 1) of the electronic device (e.g., the electronic device 101 of FIG. 1). The first module 380 may be disposed under the display panel 363, of the window 361 and the display panel 363 included in the display 360, and a partial area 363b, which corresponds to the position where the first module 380 is disposed in the display panel 363, may be formed as a hole.

According to various embodiments of the disclosure, the first module 380 may include a PCB 381, an image sensor 383, an optical sensor 385, and an infrared filter 387. The PCB 381, the image sensor 383, the optical sensor 385, and the infrared filter 387 may have the same structure and perform the same function as the PCB 381, the image sensor 383, the optical sensor 385, and the infrared filter 387 of FIG. 3A.

Part (a) of FIG. 3C is a side view illustrating a first module 380 disposed under the display 360, and part (b) of FIG. 3C is a front view illustrating the first module 380.

Referring to FIG. 3C, the first module 380 for the operation of the camera and the operation of the optical sensor may be disposed under the display 360 (e.g., the display module 160 of FIG. 1) of the electronic device (e.g., the electronic device 101 of FIG. 1). The first module 380 may be disposed under the display panel 363, of the window 361 and the display panel 363 included in the display 360, and a partial area 363b, which corresponds to the position where the first module 380 is disposed in the display panel 363, may be formed as a hole.

According to various embodiments of the disclosure, the first module 380 may include a PCB 381, an image sensor 383, an optical sensor 385, and an infrared filter 387. The PCB 381, the image sensor 383, and the infrared filter 387 may have the same structure and perform the same function as the PCB 381, the image sensor 383, and the infrared filter 387 of FIGS. 3A and 3B.

According to various embodiments of the disclosure, the light receiving unit 385b included in the optical sensor 385 may be close to the image sensor 383 and may be disposed inside the area of the infrared filter 387 so as not to depart from the area of the infrared filter 387. The light emitting unit of the optical sensor 385 may be disposed in a position (e.g., the bezel) other than the first module 380. The area of the infrared filter 384 in which only the light receiving unit 385b of the optical sensor 385 may be reduced in size as compared with the area of the infrared filter in which the light emitting unit 385a and the light receiving unit 385b both are disposed as shown in FIGS. 3A and 3B.

The first module 380 is illustrated in FIG. 3C as disposed under the predetermined area 363b formed as a hole in the display panel 363 is described, but may be disposed under the predetermined area 363a set to have a transmittance that allows the operation of the camera and the operation of the optical sensor in the display panel 363 as shown in FIG. 3A.

Part (a) of FIG. 3D is a side view illustrating the first module 380 disposed under the display 360, and part (b) of FIG. 3D is a front view illustrating the first module 380.

Referring to FIG. 3D, the first module 380 for the operation of the camera and the operation of the optical sensor may be disposed under the display 360 (e.g., the display module 160 of FIG. 1) of the electronic device (e.g., the electronic device 101 of FIG. 1). The first module 380 may be disposed under the display panel 363, of the window 361 and the display panel 363 included in the display 360, and a partial area 363b, which corresponds to the position where the first module 380 is disposed in the display panel 363, may be formed as a hole.

According to various embodiments of the disclosure, the first module 380 may include a PCB 381, an image sensor 383, an optical sensor 385, and an infrared filter 387. The PCB 381, the image sensor 383, and the infrared filter 387 may have the same structure and perform the same function as the PCB 381, the image sensor 383, and the infrared filter 387 of FIGS. 3A to 3C.

According to various embodiments of the disclosure, the optical sensor 385 may include a light emitting unit 385a and a plurality of light receiving units 385b, 385c, and 385d. The light emitting unit 385a and the plurality of light receiving units 385b, 385c, and 385d of the optical sensor 385 may be close to the image sensor 383 and may be disposed inside the area of the infrared filter 387 so as not to depart from the area of the infrared filter 387.

The first module 380 is illustrated in FIG. 3D as disposed under the predetermined area 363b formed as a hole in the display panel 363 is described, but may be disposed under the predetermined area 363a set to have a transmittance that allows the operation of the camera and the operation of the optical sensor in the display panel 363 as shown in FIG. 3A.

Figure 5:
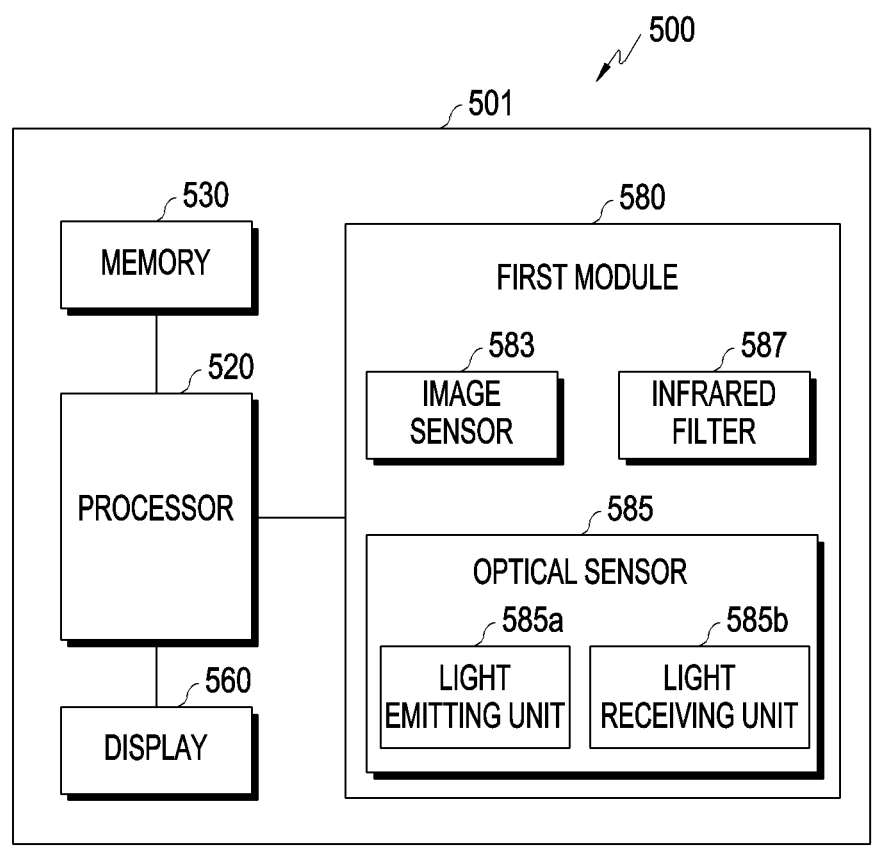
FIG. 5 is a block diagram illustrating an electronic device according to an embodiment of the disclosure.

FIG. 5 is a block diagram 500 illustrating an electronic device according to an embodiment of the disclosure.

Referring to FIG. 5, according to various embodiments of the disclosure, an electronic device 501 (e.g., the electronic device 101 of FIG. 1) may include a first module 580, a processor 520 (e.g., the processor 120 of FIG. 1), a memory 530 (e.g., the memory 130 of FIG. 1), and a display 560 (e.g., the display module 160 of FIG. 1 or the display module 160 of FIG. 2).

According to various embodiments of the disclosure, the first module 580 may perform the operation for a camera and the operation for an optical sensor and may include an image sensor 583, an optical sensor 585 and an infrared filter 587.

According to an embodiment of the disclosure, the image sensor 583 (e.g., the image sensor 383 of FIGS. 3A to 3D) may convert the light received through a lens into a digital signal, for the operation of the camera, and output it as image data. The image sensor 583 may include RGB pixels to absorb each corresponding wavelength band of light and output it as a digital signal.

According to an embodiment of the disclosure, the optical sensor 585 (e.g., the optical sensor 385 of FIGS. 3A to 3D) may include a light emitting unit 585a (e.g., the light emitting unit 385a of FIGS. 3A to 3D) and at least one light receiving unit 585b (e.g., the light receiving unit 385b of FIGS. 3A to 3D). The at least one light receiving unit 585b may include a photo diode.

The light emitting unit 585a and light receiving unit 385b of the optical sensor 585 may be close to the image sensor 583 and may be disposed inside the area of the infrared filter 587 so as not to depart from the area of the infrared filter 587.

The light receiving unit 585b included in the optical sensor 585 may be close to the image sensor 583 and may be disposed inside the area of the infrared filter 587 so as not to depart from the area of the infrared filter 587. The light emitting unit 585a of the optical sensor 585 may be disposed in an area (e.g., the bezel area) other than the first module 580.

The light emitting unit 585*a* and the plurality of light receiving units of the optical sensor 585 may be close to the image sensor 583 and may be disposed inside the area of the infrared filter 587 so as not to depart from the area of the infrared filter 587.

According to an embodiment of the disclosure, the infrared filter 587 (e.g., the infrared filter 387 of FIGS. 3A to 3D) may be designed to block the infrared light received through the infrared wavelength band upon receiving the image data through the image sensor 583 for the operation of the camera and transmit the infrared light through a partial infrared wavelength band of the infrared wavelength band blocked for the operation of the camera, for the operation of the optical sensor.

According to various embodiments of the disclosure, the first module 580 (e.g., the first module 380 of FIG. 3A) may be disposed under the display panel, of the window (e.g., the window 361 of FIG. 3A) and the display panel (e.g., the display panel 363 of FIG. 3A) included in the display 560 (e.g., the display 360 of FIG. 3A) as shown in FIG. 3A, and the transmittance of a partial area (e.g., the partial area 363*a* of FIG. 3A) corresponding to the position where the first module 580 is disposed in the display panel may be set to a transmittance at which the operation of the camera and the operation of the optical sensor are possible. For example, the transmittance of the predetermined area may be set to about 20-30%.

According to various embodiments of the disclosure, the first module 580 (e.g., the first module 380 of FIGS. 3B to 3D) may be disposed under the display panel, of the window (e.g., the window 361 of FIGS. 3B to 3D) and the display panel (e.g., the display panel 363 of FIGS. 3B to 3D) included in the display 560 (e.g., the display 360 of FIGS. 3B to 3D) as shown in FIGS. 3B to 3D, and a partial area (e.g., the partial area 363*b* of FIGS. 3B to 3D), which corresponds to the position where the first module 580 is disposed in the display panel, may be formed as a hole.

According to various embodiments of the disclosure, the processor 520 may divide the time for outputting one frame into a first time period for the operation of the camera and a second time period for the operation of the optical sensor.

According to an embodiment of the disclosure, upon receiving a display sync signal for updating the frame per second, if identifying a request for the operation of the camera, the processor 520 may receive image data through the image sensor 583 during the first time period for the operation of the camera of the time for outputting one frame. The request for the operation of the camera may indicate a request for executing a camera application and receiving image data through the image sensor 583.

According to an embodiment of the disclosure, the processor 520 may receive an optical signal through the light receiving unit 585*b* of the optical sensor 585 while receiving the image data through the image sensor 583 and may compensate for the image data received through the image sensor 583 using an auto white balance (AWB) algorithm based on the received optical signal during the first time period. In order to compensate the image data received through the image sensor 583 using the AWB algorithm based on the optical signal received through the light receiving unit 585*b* of the optical sensor 585 during the first time period, the infrared filter 587 of the first module 580 may be designed to be able to transmit the infrared light through a partial infrared wavelength band of the infrared wavelength band blocked through the operation of the camera for the operation of the optical sensor, thus addressing issues with color that may arise in the image data received through the image sensor 583.

Since each light source has a different amount of infrared light, the processor 520 may determine the type (e.g., sunlight, incandescent lamp, or fluorescent lamp) of the ambient light source using an illuminance sensor and differently apply an auto white balance (AWB) algorithm for each type of light source to compensate for the image data received through the image sensor 583, reducing color distortion in the image data.

According to an embodiment of the disclosure, the time during which the processor 520 receives the image data through the image sensor 583 in the first time period may indicate a shutter speed time. The processor 521 may adjust the time for receiving image data through the image sensor in the first time period according to the shutter speed time.

According to an embodiment of the disclosure, when receiving the display sync signal for updating the frame per second, if identifying the request for the operation of the optical sensor, the processor 520 may measure the amount of the light emitted from the light emitting unit 585*a* of the optical sensor 585, reflected by a target object, and received by the light receiving unit 585*b* during a second time period for the operation of the optical sensor of the time to output one frame, detecting whether the target object is near the electronic device 501 or whether the target object comes closer to or farther away from the electronic device 501. According to an embodiment of the disclosure, the processor 520 may perform the operation of the optical sensor for a predetermined time (e.g., 2 ms) set in the second time period.

According to various embodiments of the disclosure, in a case where the first module 580 (e.g., the first module 380 of FIG. 3A) is disposed under a partial area (e.g., the partial area 363*a* of FIG. 3A) set to have the transmittance which allows the operation of the camera and the operation of the optical sensor in the display (e.g., the display panel 363 of FIG. 3A), the processor 520 may set at least one remaining duty cycle, except for the last duty cycle, among a plurality of duty cycles which are operated in the display, to be used as the first time period and set the last duty cycle to be used as the second time period.

According to an embodiment of the disclosure, the processor 520 may set at least one remaining duty cycle, except for the last duty cycle, among the plurality of duty cycles operated in the display 560 during the time to output one frame, to be used as the first time period and set the last duty cycle to be used as the second time period, based on display operation information (e.g., the refresh rate of the display, the number of duty cycles, the last duty cycle to be used as the second time period for the operation of the optical sensor, and the duty ratio).

For example, upon identifying that four duty cycles are operated in the display 560 during the time to output one frame, based on display operation information (e.g., the refresh rate of the display, the number of duty cycles, the last duty cycle determined as the second time period for the operation of the optical sensor, and the duty ratio), the processor 520 may set the first duty cycle, the second duty cycle, and the third duty cycle as the first time period and set the fourth duty cycle, which is the last duty cycle, as the second time period for the operation of the optical sensor.

According to an embodiment of the disclosure, to avoid influence of the image of the display, the processor 520 may perform the operation of the camera in at least one display off time of at least one duty cycle included in the first time period and perform the operation of the optical sensor in the display off time of the last duty cycle included in the second time period.

According to an embodiment of the disclosure, upon identifying a request for the operation of the camera when a display sync signal for updating the frame per second is received, the processor 520 may receive image data through the image sensor 583 and receive an optical signal through the light receiving unit 585b of the optical sensor 585 for compensating for the image data during at least one display off time of the at least one duty cycle used as the first time period.

According to an embodiment of the disclosure, upon identifying a request for the operation of the camera when the display sync signal is received, the processor 520 may receive image data through the image sensor 583 in the first display off time of the first duty cycle among the at least one duty cycle used as the first time period and receive the optical signal through the light receiving unit 585b of the optical sensor 585 for compensating for the image data. The processor 520 may receive the image data through the image sensor 583 during a time shorter than the first display off time and receive the optical signal through the light receiving unit 585b of the optical sensor 585 for compensating for the image data.

According to an embodiment of the disclosure, the processor 520 may determine the time of performing the operation of the camera for receiving the image data through the image sensor 583 based on the shutter speed time of the camera operation information (e.g., the frame rate (FPS) of the camera, shutter speed time, and international organization of standards (IOS). If an additional time for the operation of the camera is needed after the operation of the camera is performed in the first display off time of the first duty cycle among the at least one duty cycle used as the first time period, the processor 520 may receive the image data through the image sensor 583 in the second display off time of the second duty cycle among the at least one duty cycle used as the first time period and receive the optical signal through the light receiving unit 585b of the optical sensor 585 for compensating for the image data. The processor 520 may receive the image data through the image sensor 583 during a time shorter than the second display off time and receive the optical signal through the light receiving unit 585b of the optical sensor 585 for compensating for the image data.

For example, upon identifying that the time for the operation of the camera is 4 ms when the shutter speed time is 250 s, the processor 520 may receive the image data through the image sensor 583 for 2 ms, which is the time of the operation of the camera, in the display off time, 2.09 ms, of the first duty cycle (4.17 ms) among the four duty cycles operated in the display 560 and receive the optical signal through the light receiving unit 585b of the optical sensor 585 for compensating for the image data during the time to output one frame. The processor 520 may receive the image data through the image sensor 583 for 2 ms, which is the time of the operation of the camera, in the display off time, 2.09 ms, of the second duty cycle (4.17 ms) and receive the optical signal through the light receiving unit 585b of the optical sensor 585 for compensating for the image data.

According to an embodiment of the disclosure, when receiving the display sync signal, if identifying the request for the operation of the optical sensor, the processor 520 may measure the amount of the light emitted from the light emitting unit 585a of the optical sensor 585, reflected by a target object, and received by the light receiving unit 585b during the display off time of the last duty cycle used as the second time, performing the operation of the optical sensor of detecting whether the target object is near the electronic device 501 or whether the target object comes closer to or farther away from the electronic device 501.

According to various embodiments of the disclosure, in a case where the first module 580 (e.g., the first module 380 of FIG. 3A) is disposed under a partial area (e.g., the partial area 363a of FIG. 3A) set to have the transmittance which allows the operation of the camera and the operation of the optical sensor in the display (e.g., the display panel 363 of FIG. 3A), if one duty cycle is operated in the display 560 during the time to output one frame, the processor 520 may divide the display off time of the one duty cycle into the first time period and the second time period.

According to an embodiment of the disclosure, the processor 520 may set a time from the time when the display off starts to a time, a predetermined time before the time when the next frame is received, to be used as the first time period, and set the predetermined time to be used as the second time period. The predetermined time may denote the time set for the operation of the optical sensor. For example, the predetermined time may be the time set for the operation of the optical sensor, e.g., 2 ms.

According to an embodiment of the disclosure, upon identifying a request for the operation of the camera when a display sync signal for updating the frame per second is received, the processor 520 may receive image data through the image sensor 583 and receive an optical signal through the light receiving unit 585b of the optical sensor 585 for compensating for the image data during the time from the time when the display off starts to the time, the predetermined time before the time when the next frame is received, used as the first time period.

According to an embodiment of the disclosure, when receiving the display sync signal, if identifying the request for the operation of the optical sensor, the processor 520 may measure the amount of the light emitted from the light emitting unit 585a of the optical sensor 585, reflected by a target object, and received by the light receiving unit 585b during the predetermined time used as the second time, performing the operation of the optical sensor of detecting whether the target object is near the electronic device 501 or whether the target object comes closer to or farther away from the electronic device 501.

According to various embodiments of the disclosure, in a case where the first module 580 (e.g., the first module 380 of FIG. 3A) is disposed under a partial area (e.g., the partial area 363a of FIG. 3A) set to have the transmittance which allows the operation of the camera and the operation of the optical sensor in the display (e.g., the display panel 363 of FIG. 3A), the processor 520 may detect the start time $T_{PS\_delay}$ of the second time period through Equation 1 below, when at least one duty cycle is operated in the display 560 during the time to output one frame.

$$t_{ps\_delay} = \frac{(N_{PS} - 1) + R_{duty}}{f_{display} \times N_{duty}} \quad \text{Equation 1}$$

$N_{PS}$: a duty cycle determined as the second time period for the operation of the optical sensor among at least one duty cycle
$R_{duty}$: duty ratio
$f_{display}$: display refresh rate $N_{duty}$: The number of duty cycles operated in the display during the time to output one frame According to an embodiment of the disclosure, the start time $t_{PS\_delay}$ of the second time period may denote the time when the light emitting unit 585a of the optical sensor 585 emits light, and the light receiving unit 585b of the optical sensor 585 starts receiving the light.

According to an embodiment of the disclosure, the start time $t_{PS\_delay}$ of the second time period may be included in the display off time of the last duty cycle among at least one duty cycle operated in the display.

According to an embodiment of the disclosure, when receiving the display sync signal for updating the frame per second, if identifying the request for the operation of the optical sensor, the processor 520 may measure the amount of the light emitted from the light emitting unit 585a of the optical sensor 585, reflected by a target object, and received by the light receiving unit 585b from the start time $t_{PS\_delay}$ of the second time period to the time of reception of the next frame, performing the operation of the optical sensor of detecting whether the target object is near the electronic device 501 or whether the target object comes closer to or farther away from the electronic device 501.

According to various embodiments of the disclosure, in the case where the first module 580 (e.g., the first module 380 of FIGS. 3B to 3D) is disposed under the predetermined area (e.g., the predetermined area 363b of FIGS. 3A to 3D) formed as a hole in the display (e.g., the display panel 363 of FIGS. 3B to 3D), the processor 520 may set a time from the time when the display on of the first duty cycle operated in the display 560 starts to a time, a predetermined time before the time of reception of the next frame, to be used as the first time period and set the predetermined time to be used as the second time period.

According to an embodiment of the disclosure, since there is no influence of the image output from the display, the processor 520 may perform the operation of the camera during the time from the time when the display on of the first duty cycle starts to the time, the predetermined time before the time of reception of the next frame, included in the first time period.

According to an embodiment of the disclosure, the predetermined time included in the second time period may be a time set for the operation of the optical sensor, e.g., 2 ms.

According to an embodiment of the disclosure, the predetermined time included as the second time period may be included in the display off time of the last duty cycle among at least one duty cycle operated in the display.

According to an embodiment of the disclosure, upon identifying a request for the operation of the camera when a display sync signal for updating the frame per second is received, the processor 520 may receive image data through the image sensor 583 and receive an optical signal through the light receiving unit 585b of the optical sensor 585 for compensating for the image data during the time from the time when the display on of the first duty cycle starts to the time, the predetermined time before the time when the next frame is received, used as the first time period.

According to an embodiment of the disclosure, the processor 520 may determine the time of performing the operation of the camera for receiving the image data through the image sensor 583 based on the shutter speed time of the camera operation information (e.g., the frame rate (frames per second (FPS)) of the camera, shutter speed time, and IOS). The processor 520 may receive the image data through the image sensor 583 and receive the optical signal through the light receiving unit 585b of the optical sensor 585 for compensating for the image data during the display on time and display off time of at least one duty cycle included in the first time period.

According to an embodiment of the disclosure, when receiving the display sync signal, if identifying the request for the operation of the optical sensor, the processor 520 may measure the amount of the light emitted from the light emitting unit 585a of the optical sensor 585, reflected by a target object, and received by the light receiving unit 585b during the predetermined time used as the second time, performing the operation of the optical sensor of detecting whether the target object is near the electronic device 501 or whether the target object comes closer to or farther away from the electronic device 501.

According to various embodiments of the disclosure, in a case where the first module 580 (e.g., the first module 380 of FIG. 3A) is disposed under a partial area formed as a hole in the display (e.g., the display panel 363 of FIG. 3A), the processor 520 may detect the start time $T_{PS\_delay1}$ of the second time period through Equation 2 below, when at least one duty cycle is operated in the display 560 during the time to output one frame.

$$t_{ps\_delay1} = \frac{1}{f_{display}} - t_{ps\_IT} \qquad \text{Equation 2}$$

$f_{display}$: display refresh rate $t_{ps\_IT}$: the second time period set for the operation of the optical sensor According to an embodiment of the disclosure, the start time $t_{PS\_delay1}$ of the second time period may denote the time when the light emitting unit 585a of the optical sensor 585 emits light, and the light receiving unit 585b of the optical sensor 585 starts receiving the light.

According to an embodiment of the disclosure, the start time $t_{PS\_delay1}$ of the second time period may be included in the display off time of the last duty cycle among at least one duty cycle operated in the display.

According to an embodiment of the disclosure, when receiving the display sync signal for updating the frame per second, if identifying the request for the operation of the optical sensor, the processor 520 may measure the amount of the light emitted from the light emitting unit 585a of the optical sensor 585, reflected by a target object, and received by the light receiving unit 585b from the start time $t_{PS\_delay1}$ of the second time period to the time of reception of the next frame, performing the operation of the optical sensor of detecting whether the target object is near the electronic device 501 or whether the target object comes closer to or farther away from the electronic device 501.

According to various embodiments of the disclosure, when the light emitting unit 585a of the optical sensor 585 is disposed under the display 560 of the electronic device or in the bezel area of the electronic device, the processor 520 may control to perform a synchronization operation between the light emitting unit 585a and light receiving unit 585b of the optical sensor 585.

According to various embodiments of the disclosure, the sensitivity may be increased by connecting the optical sensor 585 with the image sensor 583 including RGB pixels, during the second time period for the operation of the optical sensor.

According to various embodiments of the disclosure, the function of the illuminance sensor may be performed using the light receiving unit 585b of the optical sensor 585 and the image sensor 583.

According to various embodiments of the disclosure, when the light receiving unit 585b of the optical sensor 585 is used independently from the light emitting unit of the optical sensor 585, the light receiving unit 585b of the optical sensor 585 may be used to function to recognize the infrared (IR) light.

According to various embodiments of the disclosure, when the first module 580 includes a plurality of light receiving units 585b, the infrared filter may be designed to transmit a wavelength band for another function (e.g., illuminance or spectrometer) other than the wavelength band (e.g., a 940 nm band) capable of transmitting infrared light for the operation of the optical sensor.

According to various embodiments of the disclosure, the memory 530 may be implemented to be substantially the same or similar to the memory 130 of FIG. 1.

According to various embodiments of the disclosure, the display 560 may be implemented in substantially the same or similar manner to the display module 160 of FIG. 1.

Figure 6A:
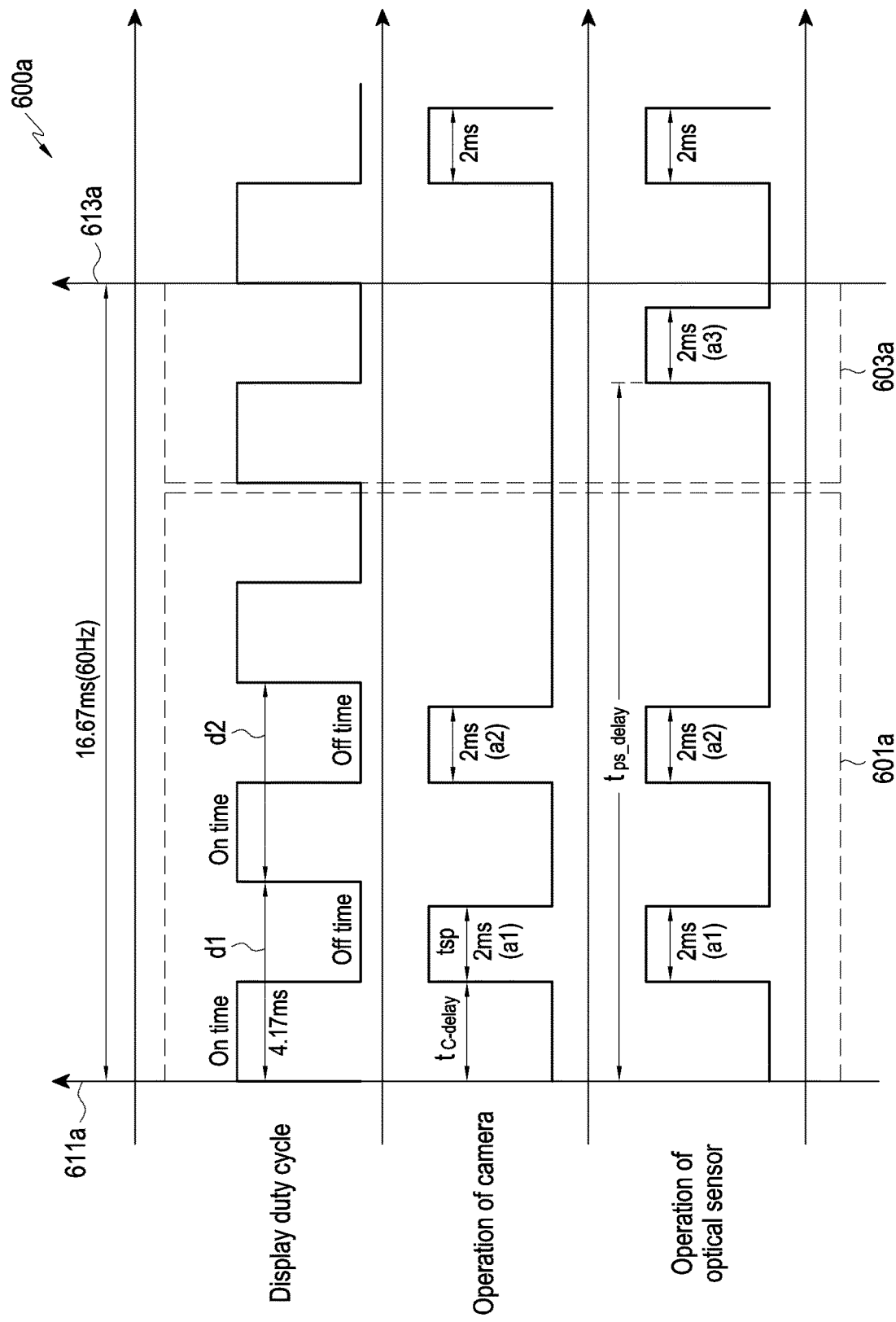
FIGS. 6A, 6B, and 6C are views illustrating operations of a camera and operations of an optical sensor using a first module in an electronic device according to various embodiments of the disclosure.
Figure 6B:
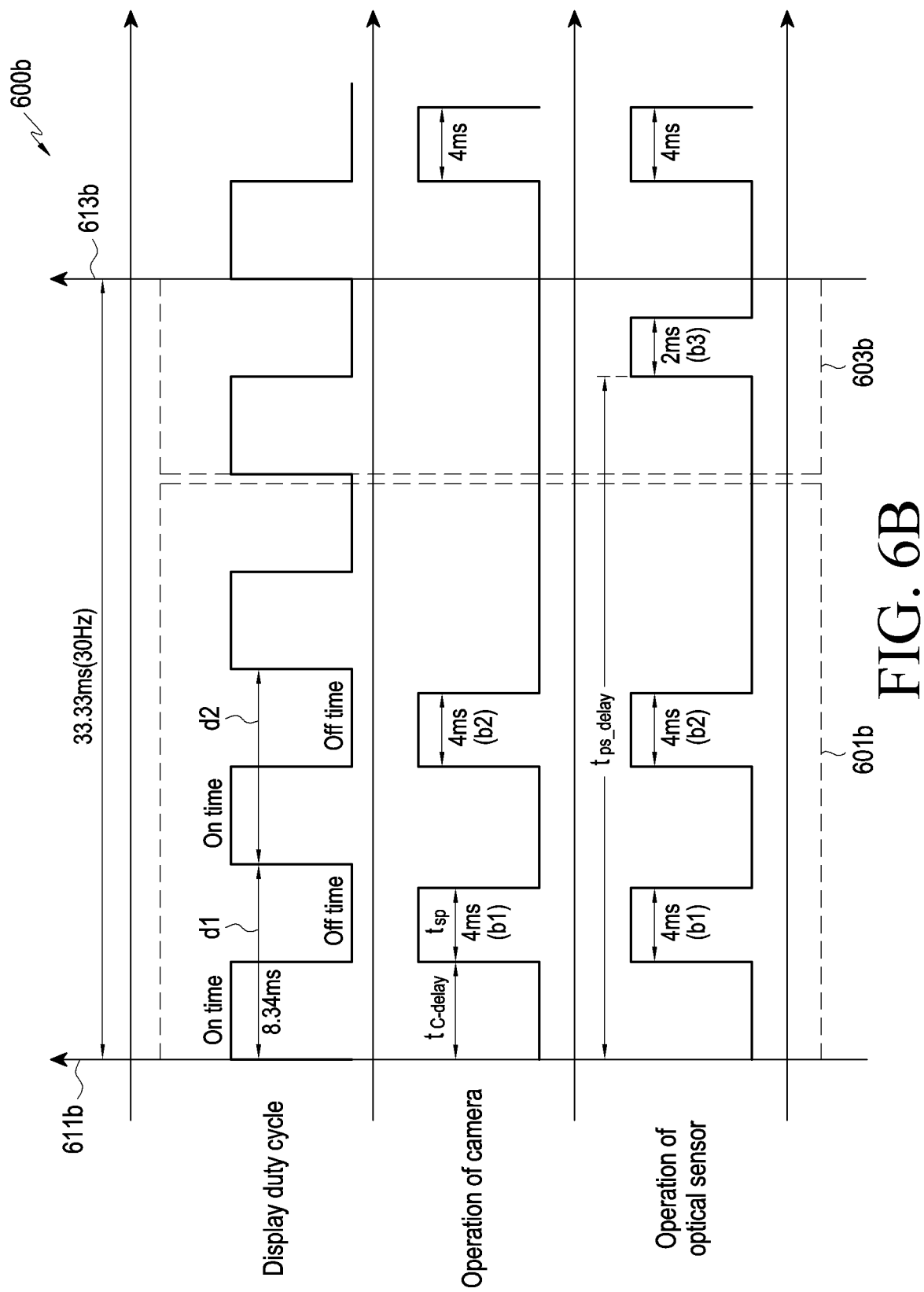
Figure 6C:
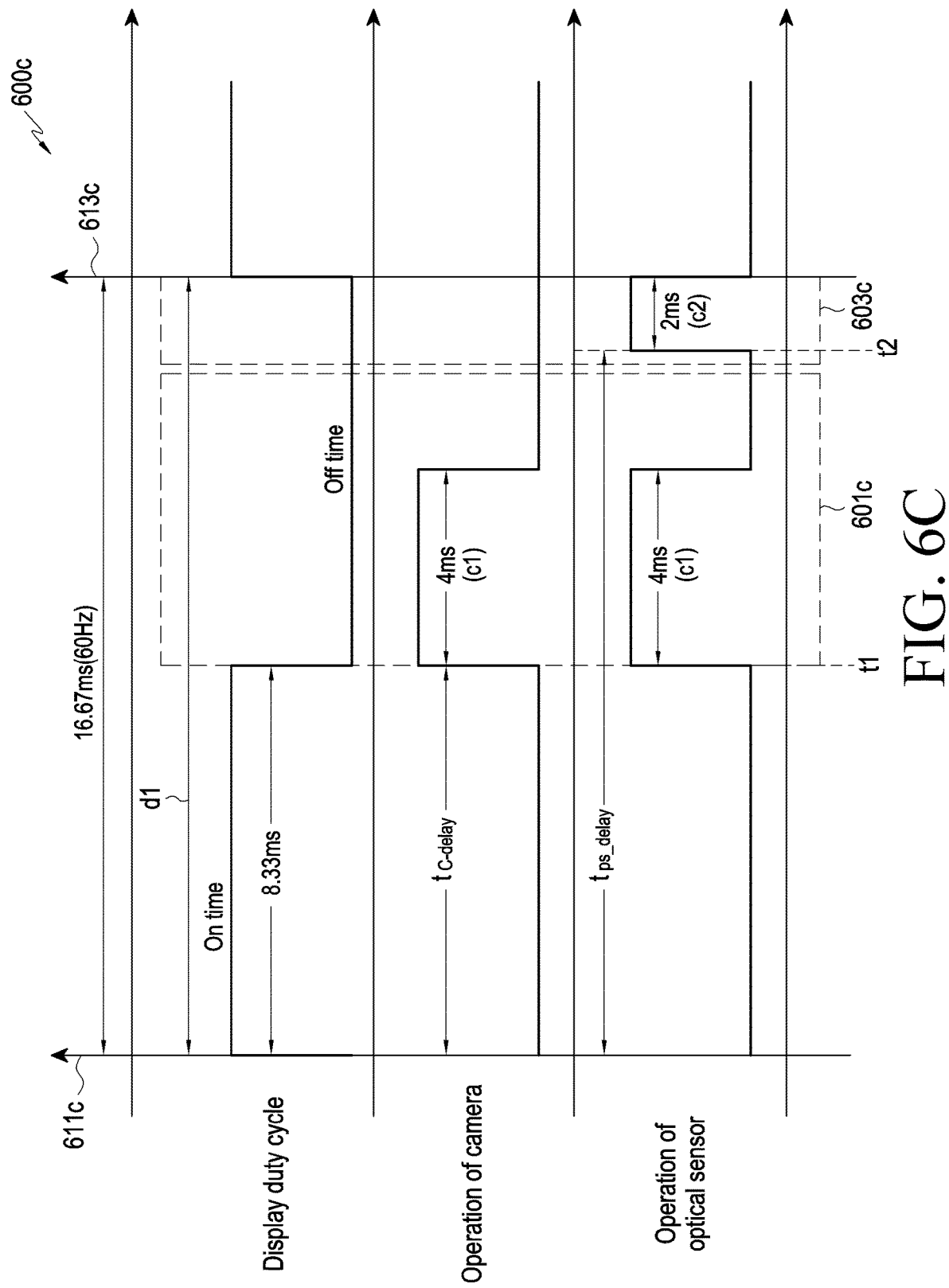

FIGS. 6A, 6B, and 6C are views 600a to 600c illustrating operations of a camera and operations of an optical sensor using a first module in an electronic device according to various embodiments of the disclosure.

The operations of dividing the time to output one frame into a first time period for the operation of the camera and a second time period for the operation of the optical sensor and performing the operation of the camera and the operation of the optical sensor in a case where the first module (e.g., the first module 380 of FIG. 3A or the first module 580 of FIG. 5) is disposed under a predetermined area (e.g., the predetermined area 363a of FIG. 3A) set to have a transmittance at which the operation of the camera and the operation of the optical sensor are possible in the display (e.g., the display panel (e.g., the display panel 363 of FIG. 3A)) are described with reference to FIGS. 6A to 6C.

Described in connection with FIG. 6A is an example of identifying that an operation is performed at 60 Hz, four duty cycles, the fourth duty cycle, and 50% duty, based on display operation information for the electronic device (e.g., the display refresh rate, number of duty cycles, the last duty cycle to be used as the second time period for the operation of the optical sensor, and the duty ratio), and the camera of the electronic device operates at 60FPS, a shutter speed of 250s, and ISO 50, based on camera operation information for the electronic device (e.g., the camera frame rate (FPS), shutter speed, and IOS).

Referring to FIG. 6A, the electronic device (e.g., the electronic device 101 of FIG. 1 or the electronic device 501 of FIG. 5) may be configured to divide the time (16.76 ms) to output one frame into a first time period 601a for the operation of the camera and a second time period 603b for the operation of the optical sensor. The first time period 601a may include the first duty cycle, the second duty cycle, and the third duty cycle among the four duty cycles, and the second time period 603a may include the fourth duty cycle which is the last duty cycle.

Upon receiving a sync signal 611a and identifying a request for the operation of the camera, the electronic device may perform the operation of the camera of receiving image data through the image sensor (e.g., the image sensor 383 of FIG. 3A and/or the image sensor 583 of FIG. 5) and receiving the optical signal through the light receiving unit (e.g., the light receiving unit 385b of FIG. 3A and/or the light receiving unit 585b of FIG. 5) of the optical sensor (e.g., the optical sensor 385 of FIG. 3A and/or the optical sensor 585 of FIG. 5) for compensating for the image data during a predetermined time (2 ms) a1 set to be not more than the display off time (2.30 ms), in the display off time (2.09 ms) after the display on time (2.08 ms) of the first duty cycle (4.17 ms) d1 in the first time period 601a.

The electronic device may determine the time to perform the operation of the camera in the first time period 601a based on the shutter speed among the display operation information. As it is identified that the time to perform the operation of the camera is 4 ms when the shutter speed is 250 s, the electronic device may perform the operation of the camera of receiving image data through the image sensor (e.g., the image sensor 383 of FIG. 3A and/or the image sensor 583 of FIG. 5) and receiving an optical signal through the light receiving unit (e.g., the light receiving unit 385b of FIG. 3A and/or the light receiving unit 585b of FIG. 5) of the optical sensor (e.g., the optical sensor 385 of FIG. 3A and/or the optical sensor 585 of FIG. 5) for compensating for the image data, during a predetermined time (2 ms) a2 set to be not more than the display off time (2.08 ms) in the display off time (2.09 ms) after the display on time (2.08 ms) of the second duty cycle (4.17 ms) d2, in addition to the first time period 601a.

As it is identified that the time to perform the operation of the camera is 2 ms upon increasing the camera sensitivity ISO to 100, i.e., by two times, while reducing the shutter speed to 500s (2 ms) so as to secure the same amount of light as when the shutter speed is 250 s (4 ms) and the ISO is 50, the electronic device may perform the operation of the camera of receiving image data through the image sensor (e.g., the image sensor 383 of FIG. 3A and/or the image sensor 583 of FIG. 5) and receiving the optical signal through the light receiving unit (e.g., the light receiving unit 385b of FIG. 3A and/or the light receiving unit 585b of FIG. 5) of the optical sensor (e.g., the optical sensor 385 of FIG. 3A and/or the optical sensor 585 of FIG. 5) for compensating for the image data during a predetermined time (2 ms) a1 set to be not more than the display off time (2.09 ms), in the display off time (2.09 ms) alone after the display on time (2.08 ms) of the first duty cycle (4.17 ms) d1 in the first time period 601a.

The electronic device may control "$t_{c\text{-}delay}$" which denotes the time to the time when the operation of the camera is performed in the duty cycle and "$t_{Sp}$" which denotes the time to operate the operation of the camera in the display off time in the first time period 601a. "$t_{c\text{-}delay}$" may be a delay of the operation of the camera and include the display on time (2.08 ms), and "$t_{Sp}$" may denote the shutter speed time (2 ms) of the display off time (2.09 ms).

If the operation of the camera is completed in the first time period 601a, the electronic device may receive image data through the image sensor in the first time period 601a, from the time when the operation of the camera is completed in the first time period 601a to the time when the second time period 603a for the operation of the optical sensor is completed is completed and process the image data compensated based on the optical signal received through the light receiving unit of the optical sensor.

Upon receiving the sync signal 611a and identifying a request for the operation of the optical sensor, the electronic device may measure the amount of the light, emitted from the light emitting unit (e.g., the light emitting unit 385a of FIG. 3A and/or the light emitting unit 585a of FIG. 5) of the optical sensor (e.g., the optical sensor 385 of FIG. 3A and/or the optical sensor 585 of FIG. 5), reflected by the target object, and received by the light receiving unit (e.g., the light receiving unit 385b of FIG. 3A and/or the light receiving unit 585b of FIG. 5) and perform the operation of the optical sensor of detecting whether there is the target object near the electronic device or whether the target object comes closer or farther away from the electronic device, during a predetermined time (2 ms) a3 set of the operation of the optical sensor of the display off time (2.09 ms) of the fourth duty cycle which is the second time period 603*a*.

Upon receiving the sync signal 611*a* and identifying a request for the operation of the optical sensor, the electronic device may detect the start time ($t_{PS\_delay}$) of the second time period through Equation 1 and perform the operation of the optical sensor from the start time ($t_{PS\_delay}$) of the second time period to the time of reception of the next frame (e.g., the time 613*a* of reception of a next sync signal).

Described in connection with FIG. 6B is an example of identifying that an operation is performed at 30 Hz, four duty cycles, the fourth duty cycle, and 50% duty, based on display operation information for the electronic device (e.g., the display refresh rate, number of duty cycles, the last duty cycle to be used as the second time period for the operation of the optical sensor, and the duty ratio), and the camera of the electronic device operates at 30FPS, a shutter speed of 125*s*, and ISO 50, based on camera operation information (e.g., the camera frame rate (FPS), shutter speed, and international organization for standardization (ISO)).

Referring to FIG. 6B, the electronic device (e.g., the electronic device 101 of FIG. 1 or the electronic device 501 of FIG. 5) may be configured to divide the time (33.33 ms) to output one frame into a first time period 601*b* for the operation of the camera and a second time period 603*b* for the operation of the optical sensor. The first time period 601*b* may include the first duty cycle, the second duty cycle, and the third duty cycle among the four duty cycles, and the second time period 603*b* may include the fourth duty cycle which is the last duty cycle.

Upon receiving a sync signal 611*b* and identifying a request for the operation of the camera, the electronic device may perform the operation of the camera of receiving image data through the image sensor (e.g., the image sensor 383 of FIG. 3A and/or the image sensor 583 of FIG. 5) and receiving the optical signal through the light receiving unit (e.g., the light receiving unit 385*b* of FIG. 3A and/or light receiving unit 585*b* of FIG. 5) of the optical sensor (e.g., the optical sensor 385 of FIG. 3A and/or the optical sensor 585 of FIG. 5) for compensating for the image data during a predetermined time (4 ms) b1 set to be not more than the display off time (1.04 ms), in the display off time (4.18 ms) after the display on time (4.16 ms) of the first duty cycle (8.34 ms) d1 in the first time period 601*b*.

The electronic device may determine the time to perform the operation of the camera in the first time period 601*b* based on the shutter speed among the display operation information. As it is identified that the time to perform the operation of the camera is 8 ms when the shutter speed is 125 s, the electronic device may perform the operation of the camera of receiving image data through the image sensor (e.g., the image sensor 383 of FIG. 3A and/or the image sensor 583 of FIG. 5) and receiving an optical signal through the light receiving unit (e.g., the light receiving unit 385*b* of FIG. 3A and/or the light receiving unit 585*b* of FIG. 5) of the optical sensor (e.g., the optical sensor 385 of FIG. 3A and/or the optical sensor 585 of FIG. 5) for compensating for the image data, during a predetermined time (4 ms) b2 set to be not more than the display off time (4.18 ms) in the display off time (4.18 ms) after the display on time (4.16 ms) of the second duty cycle (8.34 ms) d2, in addition to the first time period 601*b*.

The electronic device may control "$t_{c\text{-}delay}$" which denotes the time to the time when the operation of the camera is performed in the duty cycle and "$t_{Sp}$" which denotes the time to operate the operation of the camera in the display off time in the first time period 601*b*. "$t_{c\text{-}delay}$" may be a delay of the operation of the camera and include the display on time (4.16 ms), and "$t_{Sp}$" may denote the shutter speed time (4 ms) of the display off time (4.18 ms).

If the operation of the camera is completed in the first time period 601*b*, the electronic device may receive image data through the image sensor in the first time period 601*b*, from the time when the operation of the camera is completed in the first time period 601*b* to the time when the second time period 603*b* for the operation of the optical sensor is completed is completed and process the image data compensated based on the optical signal received through the light receiving unit of the optical sensor.

Upon receiving the sync signal 611*b* and identifying a request for the operation of the optical sensor, the electronic device may measure the amount of the light, emitted from the light emitting unit (e.g., the light emitting unit 385*a* of FIG. 3A and/or the light emitting unit 585*a* of FIG. 5) of the optical sensor (e.g., the optical sensor 385 of FIG. 3A and/or the optical sensor 585 of FIG. 5), reflected by the target object, and received by the light receiving unit (e.g., the light receiving unit 385*b* of FIG. 3A and/or the light receiving unit 585*b* of FIG. 5) and perform the operation of the optical sensor of detecting whether there is the target object near the electronic device or whether the target object comes closer or farther away from the electronic device, during a predetermined time (4 ms) b3 set of the operation of the optical sensor of the display off time (4.16 ms) of the fourth duty cycle which is the second time period 603*b*.

Upon receiving the sync signal 611*b* and identifying a request for the operation of the optical sensor, the electronic device may detect the start time ($t_{PS\_delay}$) of the second time period through Equation 1 and perform the operation of the optical sensor from the start time ($t_{PS\_delay}$) of the second time period to the time of reception of the next frame (e.g., the time 613*b* of reception of a next sync signal).

Described in connection with FIG. 6C is an example of identifying that an operation is performed at 60 Hz, one duty cycle, the last duty cycle, and 50% duty, based on display operation information (e.g., the display refresh rate, number of duty cycles, the last duty cycle to be used as the second time period for the operation of the optical sensor, and the duty ratio), and the camera of the electronic device operates at 60FPS, a shutter speed of 250*s*, and ISO 50, based on camera operation information (e.g., the camera frame rate (FPS), shutter speed, and IOS).

Referring to FIG. 6C, the electronic device (e.g., the electronic device 101 of FIG. 1 or the electronic device 501 of FIG. 5) may be configured to divide the display off time (8.34 ms) of one duty cycle (16.67 ms) d1 during the time (16.67 ms) to output one frame into a first time period 601*c* for the operation of the camera and a second time period 603*c* for the operation of the optical sensor.

The electronic device may set the time from the time t1 when the display off starts to the time t2, a predetermined time (2 ms) c2 before the time (e.g., the time 613*c* of reception of the next sync signal) of reception of the next frame in the display off time (8.34 ms) of the one duty cycle (16.67 ms) d1 to be used as the first time period 601*c* and set the predetermined time c2 to be used as the second time period 603*c*.

Upon receiving a sync signal 611*c* and identifying a request for the operation of the camera, the electronic device may perform the operation of the camera of receiving image data through the image sensor (e.g., the image sensor 383 of FIG. 3A and/or the image sensor 583 of FIG. 5) and receiving the optical signal through the light receiving unit (e.g., the light receiving unit 385b of FIG. 3A and/or the light receiving unit 585b of FIG. 5) of the optical sensor (e.g., the optical sensor 385 of FIG. 3A and/or the optical sensor 585 of FIG. 5) for compensating for the image data, during a predetermined time (4 ms) c1 in the first time period 601c (6.34 ms) of the display off time (8.34 ms) after the display on time (8.33 ms) of one duty cycle (16.67 ms) d1.

The electronic device may control "$t_{c\text{-}delay}$" which denotes the time to the time when the operation of the camera is performed after receiving the sync signal 611c and "$t_{Sp}$" which denotes the time to operate the operation of the camera in the first time period 601c of the display off time. "$t_{c\text{-}delay}$" may be a delay of the operation of the camera and include the display on time (8.33 ms), and "$t_{Sp}$" may denote the shutter speed time (4 ms) of the first time period (6.34 ms).

Upon receiving the sync signal 611c and identifying a request for the operation of the optical sensor, the electronic device may measure the amount of the light, emitted from the light emitting unit (e.g., the light emitting unit 385a of FIG. 3A and/or the light emitting unit 585a of FIG. 5) of the optical sensor (e.g., the optical sensor 385 of FIG. 3A and/or the optical sensor 585 of FIG. 5), reflected by the target object, and light receiving unit (e.g., the light receiving unit 385b of FIG. 3A and/or the light receiving unit 585b of FIG. 5), and perform the operation of the optical sensor of detecting whether the target object is near the electronic device or whether the target object comes closer to or farther away from the electronic device, during the set predetermined time (2 ms) c2 corresponding to the second time period 603c.

Upon receiving the sync signal 611c and identifying a request for the operation of the optical sensor, the electronic device may detect the start time ($t_{PS\_delay}$) of the second time period through Equation 1 and perform the operation of the optical sensor from the start time ($t_{PS\_delay}$) of the second time period.

Figure 7:
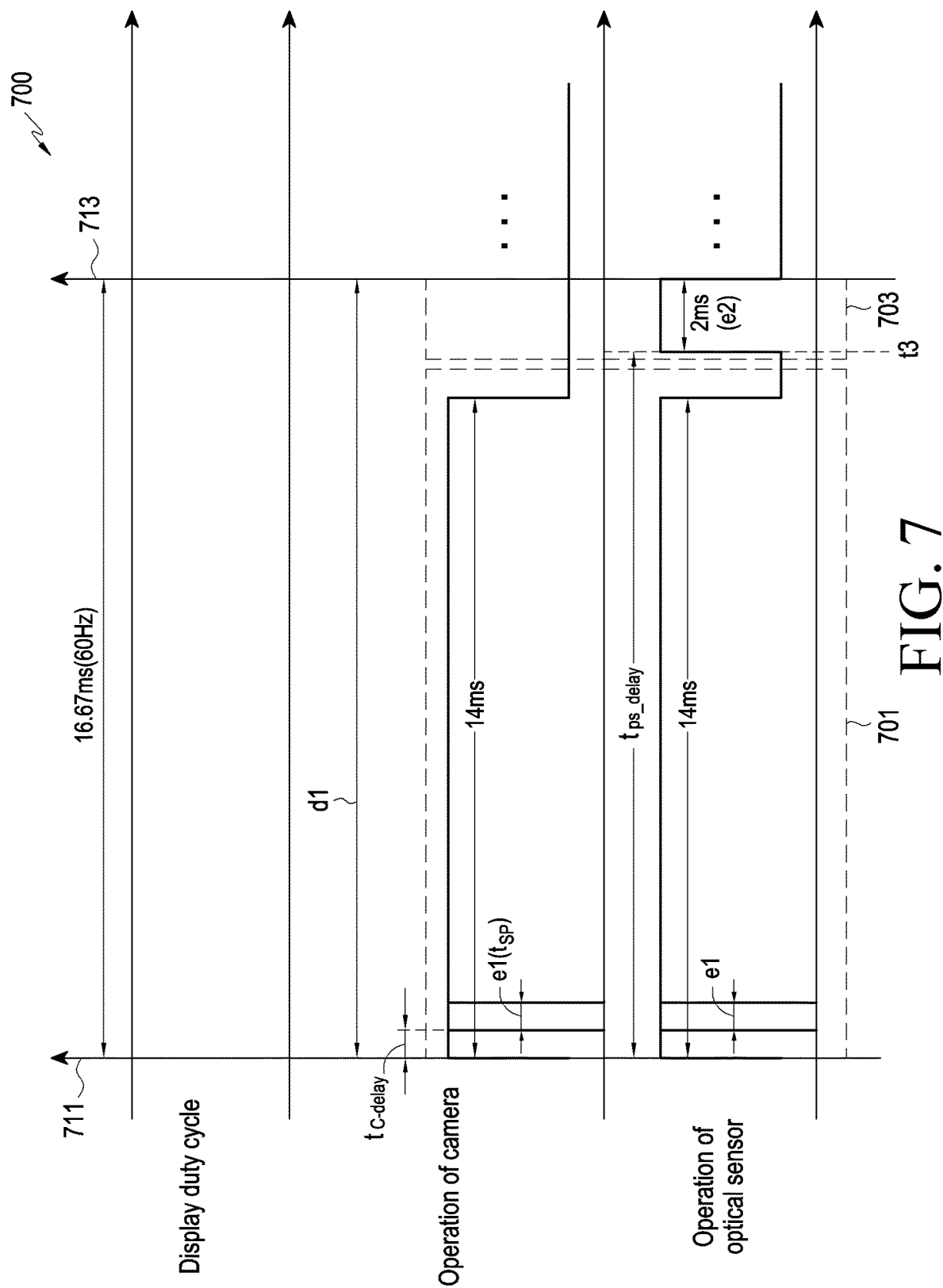
FIG. 7 is a view illustrating operations of a camera and operations of an optical sensor using a first module in an electronic device according to an embodiment of the disclosure.

FIG. 7 is a view 700 illustrating operations of a camera and operations of an optical sensor using a first module in an electronic device according to an embodiment of the disclosure.

Referring to FIG. 7, the operations of dividing the time to output one frame into a first time period for the operation of the camera and a second time period for the operation of the optical sensor and performing the operation of the camera and the operation of the optical sensor in a case where the first module (e.g., the first module 380 of FIGS. 3B to 3D or the first module 580 of FIG. 5) is disposed under a predetermined area (e.g., the predetermined area 363b of FIGS. 3B to 3D) formed as a hole in the display (e.g., the display panel (e.g., the display panel 363 of FIGS. 3B to 3D)) are described.

An example of identifying that the display operates at a refresh rate of 60 Hz, and the camera of the electronic device operates at 60FPS, a shutter speed of 250s, and ISO of 50 is described with reference to FIG. 7.

Referring to FIG. 7, if at least one duty cycle is operated during the time (16.67 ms) to output one frame, the electronic device (e.g., the electronic device 101 of FIG. 1 or the electronic device 501 of FIG. 5) may set the time from the time (e.g., the time 711 of reception of a sync signal) when the display on of the duty cycle (16.67 ms) d1 starts to the time t3, a predetermined time (2 ms) e2 before the time of reception of the next frame (e.g., the time 713 of reception of the next sync signal) to be used as a first time period 701 and set the predetermined time e2 as a second time period 703. The predetermined time (2 ms) may denote the time set for the operation of the optical sensor and may be included in the display off time of the last duty cycle among the at least one duty cycle.

Upon receiving a sync signal 711 and identifying a request for the operation of the camera, the electronic device may perform the operation of the camera of receiving image data through the image sensor (e.g., the image sensor 383 of FIG. 3A and/or the image sensor 583 of FIG. 5) and receiving the optical signal through the light receiving unit (e.g., the light receiving unit 385b of FIG. 3A and/or the light receiving unit 585b of FIG. 5) of the optical sensor (e.g., the optical sensor 385 of FIG. 3A and/or the optical sensor 585 of FIG. 5) for compensating for the image data, during the time ($T_{Sp}$) e1 corresponding to the shutter speed time after the delay ("$t_{c\text{-}delay}$") set in the first time period 701.

Upon receiving the sync signal 711 and identifying a request for the operation of the optical sensor, the electronic device may measure the amount of the light, emitted from the light emitting unit (e.g., the light emitting unit 385a of FIG. 3A and/or the light emitting unit 585a of FIG. 5) of the optical sensor (e.g., the optical sensor 385 of FIG. 3A and/or the optical sensor 585 of FIG. 5), reflected by the target object, and light receiving unit (e.g., the light receiving unit 385b of FIG. 3A and/or the light receiving unit 585b of FIG. 5), and perform the operation of the optical sensor of detecting whether the target object is near the electronic device or whether the target object comes closer to or farther away from the electronic device, during the set predetermined time (2 ms) e2 corresponding to the second time period 703.

Upon receiving the sync signal 711 and identifying a request for the operation of the optical sensor, the electronic device may detect the start time ($t_{PS\_delay1}$) of the second time period through Equation 2 and perform the operation of the optical sensor from the start time ($t_{PS\_delay1}$) of the second time period to the time of reception of the next frame (e.g., the time 713 of reception of a next sync signal).

According to various embodiments of the disclosure, an electronic device (e.g., the electronic device 501 of FIG. 5) may comprise a display (e.g., the display 560 of FIG. 5), a first module (e.g., the first module 580 of FIG. 5) for an operation of a camera and an operation of an optical sensor disposed under the display (e.g., the display panel 363 of FIGS. 3A to 3D) and at least one processor (e.g., the processor 520 of FIG. 5). The first module may include an image sensor (e.g., the image sensor 583 of FIG. 5), an infrared filter (e.g., the infrared filter 587 of FIG. 5), and the optical sensor (e.g., 585 of FIG. 5) disposed close to the image sensor and inside an area of the infrared filter. The at least one processor may be configured to separate a time to output one frame into a first time period for the operation of the camera and a second time period for the operation of the optical sensor, perform the operation of the camera in the first time period using the first module, and perform the operation of the optical sensor in the second time period using the first module.

According to various embodiments of the disclosure, the infrared filter may be configured to include a wavelength band capable of receiving an infrared optical signal in the optical sensor.

According to various embodiments of the disclosure, the at least one processor further may be configured to receive an optical signal through a light receiving unit of the optical sensor during a time of receiving image data through the image sensor and compensate for the image data received from the image sensor based on the received optical signal, in the first time period.

According to various embodiments of the disclosure, the at least one processor further may be configured to determine the time of receiving the image data through the image sensor in the first time period, according to a shutter speed time.

According to various embodiments of the disclosure, in a case where the first module (e.g., the first module 380 of FIG. 3A) is disposed under a predetermined area (e.g., the predetermined area 363a of FIG. 3A) set to have a transmittance capable of the operation of the camera and the operation of the optical sensor in the display (e.g., the display panel 363 of FIG. 3A), wherein the at least one processor further may be configured to, if a plurality of duty cycles are operated in the display during the time to output the one frame, use at least one remaining duty cycle, except for a last duty cycle among the plurality of duty cycles, as the first time period and use the last duty cycle as the second time period.

According to various embodiments of the disclosure, the at least one processor further may be configured to, if identifying a request for the operation of the camera when a sync signal is received, perform the operation of the camera of receiving image data through the image sensor in at least one display off time of the at least one duty cycle used as the first time period, and if identifying a request for the operation of the optical sensor when the sync signal is received, perform the operation of the optical sensor in a display off time of the last duty cycle used as the second time period.

According to various embodiments of the disclosure, in a case where the first module (e.g., the first module 380 of FIG. 3A) is disposed under a predetermined area (e.g., the predetermined area 363a of FIG. 3A) set to have a transmittance capable of the operation of the camera and the operation of the optical sensor in the display (e.g., the display panel 363 of FIG. 3A), wherein the at least one processor further may be configured to, if one duty cycle is operated in the display during the time to output the one frame, separate a display off time of the one duty cycle into the first time period and the second time period.

According to various embodiments of the disclosure, the at least one processor further may be configured to use a time from a time when the display off starts to a time, a predetermined time before a time of reception of a next frame, as the first time period and use the predetermined time as the second time period, in the display off time of the one duty cycle.

According to various embodiments of the disclosure, in a case where the first module (e.g., the first module 380 of FIGS. 3B to 3D) is disposed under a predetermined area (e.g., the predetermined area 363b of FIGS. 3B to 3D) formed as a hole in the display (e.g., the display panel 363 of FIGS. 3B to 3D), wherein the at least one processor further may be configured to, if at least one duty cycle is operated in the display during the time to output the one frame, use a time from a time when a display on of a first duty cycle starts to a time, a predetermined time before a time of reception of a next frame, as the first time period and use the predetermined time as the second time period.

According to various embodiments of the disclosure, the predetermined time may be configured to be included in a display off time of a last duty cycle among the at least one duty cycle.

Figure 8:
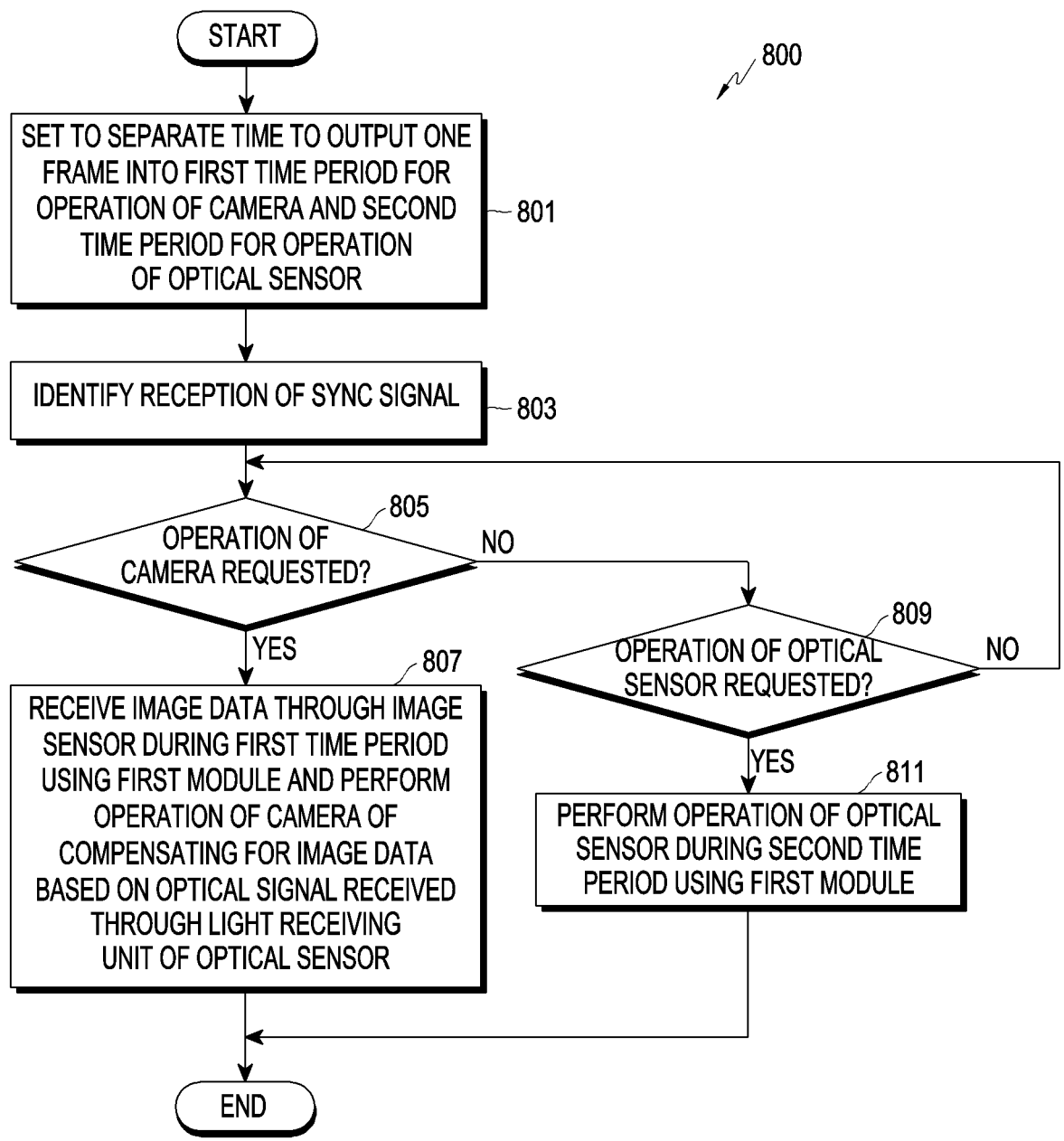
FIG. 8 is a flowchart illustrating operations of a camera and operations of an optical sensor using a first module in an electronic device according to an embodiment of the disclosure.

FIG. 8 is a flowchart 800 illustrating operations of a camera and operations of an optical sensor using a first module in an electronic device according to an embodiment of the disclosure. The operations of the camera and the operation of the optical sensor may include operations 801 to 811. According to an embodiment of the disclosure, at least one of operations 801 to 811 may be omitted or changed in order or may add other operations. The operation of the camera and the operation of the optical sensor may be performed by the electronic device 101 of FIG. 1, the processor 120 of FIG. 1, the electronic device 501 of FIG. 5, or the processor 520 of FIG. 5.

Referring to FIG. 8, in operation 801, the electronic device 501 may divide the time for outputting one frame into a first time period for the operation of the camera and a second time period for the operation of the optical sensor.

The electronic device 501 may identify reception of a sync signal in operation 803. If identifying a request for the operation of the camera in operation 805, the electronic device 501 may receive image data through an image sensor (e.g., the image sensor 583 of FIG. 5) during a first time period using a first module (e.g., the first module 380 of FIGS. 3A to 3D and/or the first module 580 of FIG. 8) and perform the operation of the camera of compensating for the image data based on the optical signal received through the light receiving unit (e.g., the light receiving unit 585b of FIG. 5) of the optical sensor (e.g., the optical sensor 585 of FIG. 5) in operation 807.

According to an embodiment of the disclosure, the electronic device 501 may execute a camera application and identify a request for reception of the image data through the image sensor, as a request for the operation of the camera.

According to an embodiment of the disclosure, upon receiving a display sync signal for updating the frame per second, if identifying a request for the operation of the camera, the electronic device 501 may receive image data through the image sensor during the first time period for the operation of the camera.

According to an embodiment of the disclosure, the electronic device 501 may receive an optical signal through the light receiving unit of the optical sensor while receiving the image data through the image sensor during the first time period and may compensate for the image data received through the image sensor 583 using an auto white balance (AWB) algorithm based on the received optical signal.

According to an embodiment of the disclosure, the time during which the electronic device 501 receives the image data through the image sensor in the first time period may indicate a shutter speed time.

According to an embodiment of the disclosure, the electronic device 501 may adjust the time of reception of the image data through the image sensor in the first time period according to the shutter speed time.

The electronic device 501 may identify reception of the sync signal in operation 803. If identifying a request for the operation of the optical sensor in operation 809, the electronic device 501 may perform the operation of the optical sensor during a second time period using the first module (e.g., the first module 380 of FIGS. 3A to 3D or the first module 580 of FIG. 8) in operation 811. When the display screen of the electronic device needs to be turned off, the electronic device 501 may identify it as a request for the operation of the optical sensor (e.g., the proximity sensor). For example, when a call needs to be performed using a receiver of the electronic device or when it needs to be determined whether the electronic device is positioned in a space, e.g., a pocket of the clothes or a bag, with the electronic device set as always on display (AOD), the electronic device may identify it as a request for the operation of the optical sensor (e.g., the proximity sensor). According to an embodiment of the disclosure, if identifying a request for the operation of the optical sensor when receiving a display sync signal for updating the frame per second, the electronic device 501 may measure the amount of the light, emitted from the light emitting unit (e.g., the light emitting unit 585a of FIG. 5) of the optical sensor (e.g., the optical sensor 585 of FIG. 5), reflected by the target object, and received by the light receiving unit (e.g., the light receiving unit 585b of FIG. 5), and detect whether there is the target object near the electronic device 501 or whether the target object comes closer to or farther away from the electronic device 501 in the second time period for the operation of the optical sensor of the time to output one frame.

According to an embodiment of the disclosure, the electronic device 501 may perform the operation of the optical sensor for a predetermined time (e.g., 2 ms) set in the second time period.

Figure 9:
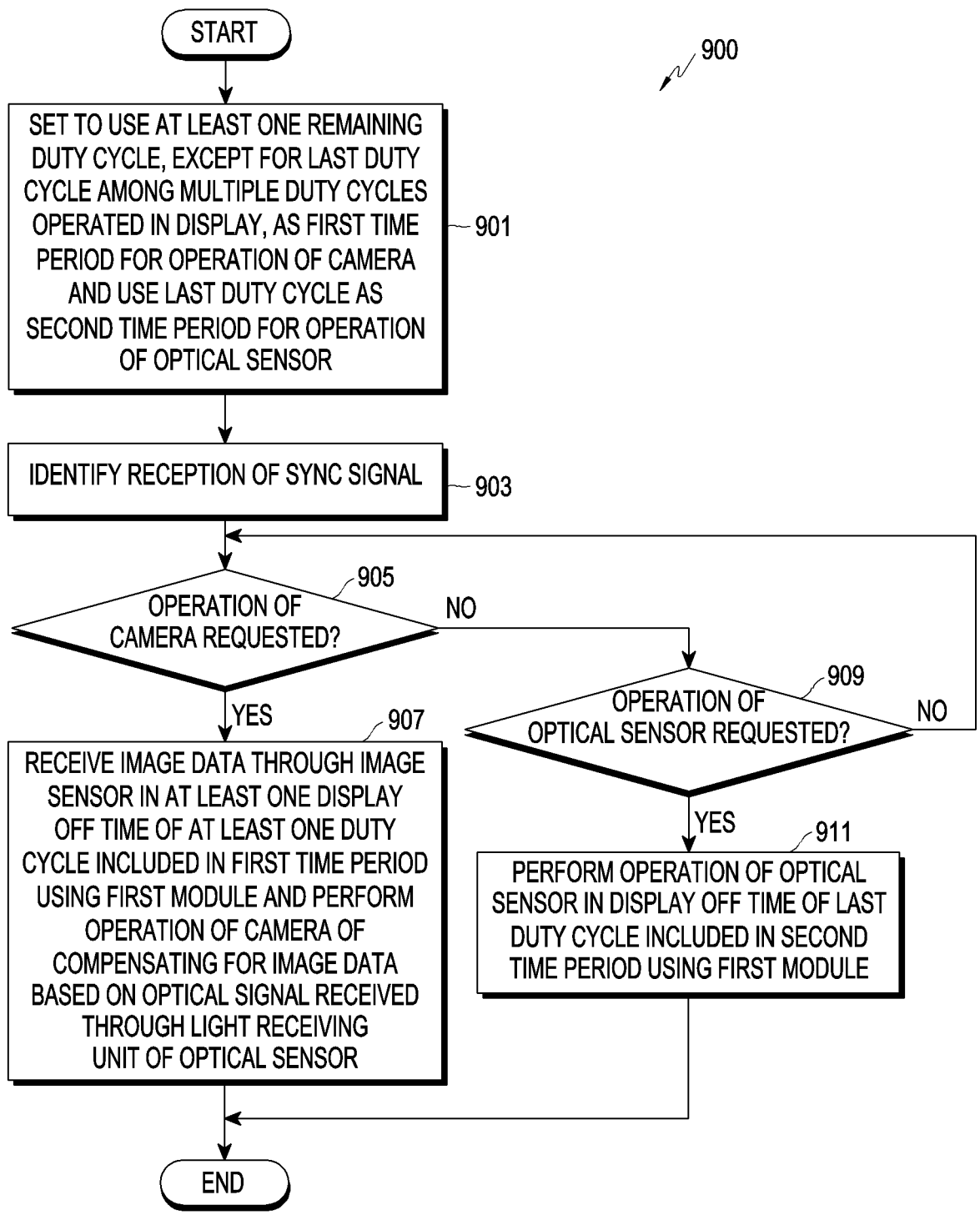
FIG. 9 is a flowchart illustrating operations of a camera and operations of an optical sensor using a first module in an electronic device according to an embodiment of the disclosure.

FIG. 9 is a flowchart 900 illustrating operations of a camera and operations of an optical sensor using a first module in an electronic device according to an embodiment of the disclosure. The operations of the camera and the operation of the optical sensor may include operations 901 to 911. According to an embodiment of the disclosure, at least one of operations 901 to 911 may be omitted or changed in order or may add other operations. The operation of the camera and the operation of the optical sensor may be performed by the electronic device 101 of FIG. 1, the processor 120 of FIG. 1, the electronic device 501 of FIG. 5, or the processor 520 of FIG. 5.

Referring to FIG. 9, in operation 901, the electronic device 501 may set at least one remaining duty cycle, except for the last duty cycle, among a plurality of duty cycles operated in the display, to be used as the first time period for the operation of the camera and set the last duty cycle to be used as the second time period for the operation of the optical sensor.

According to an embodiment of the disclosure, in a case where the first module 580 (e.g., the first module 380 of FIG. 3A and/or the first module 580 of FIG. 5) is disposed under a partial area (e.g., the partial area 363a of FIG. 3A) set to have the transmittance which allows the operation of the camera and the operation of the optical sensor in the display (e.g., the display panel 363 of FIG. 3A), the electronic device 501 may set at least one remaining duty cycle, except for the last duty cycle, among a plurality of duty cycles which are operated in the display, to be used as the first time period and set the last duty cycle to be used as the second time period.

According to an embodiment of the disclosure, the electronic device 501 may set at least one remaining duty cycle, except for the last duty cycle, among the plurality of duty cycles operated in the display (e.g., the display 560 of FIG. 5) during the time to output one frame, to be used as the first time period and set the last duty cycle to be used as the second time period, based on display operation information (e.g., the refresh rate of the display, the number of duty cycles, the last duty cycle to be used as the second time period for the operation of the optical sensor, and the duty ratio).

According to an embodiment of the disclosure, to avoid influence of the image of the display, the electronic device 501 may perform the operation of the camera in at least one display off time of at least one duty cycle included in the first time period and perform the operation of the optical sensor in the display off time of the last duty cycle included in the second time period.

According to an embodiment of the disclosure, when a plurality of duty cycles are operated in the display during the time to output one frame, the electronic device 501 may detect the start time ($t_{PS\_delay}$) of the second time period through Equation 1 above.

The electronic device 501 may identify reception of a sync signal in operation 903. If identifying a request for the operation of the camera in operation 905, the electronic device 501 may receive image data through the image sensor (e.g., the image sensor 383 of FIG. 3A and/or the image sensor 583 of FIG. 5) and perform the operation of the camera of compensating for the image data based on the optical signal received through the light receiving unit (e.g., the light receiving unit 385b of FIG. 3A or the light receiving unit 585 of FIG. 5) of the optical sensor (e.g., the optical sensor 385 of FIG. 3A and/or the optical sensor 585 of FIG. 5), in at least one display off time of at least one duty cycle included in the first time period using the first module (e.g., the first module 380 of FIG. 3A or the first module 580 of FIG. 8) in operation 907.

According to an embodiment of the disclosure, the electronic device 501 may execute a camera application and identify a request for reception of the image data through the image sensor, as a request for the operation of the camera.

According to an embodiment of the disclosure, upon identifying a request for the operation of the camera when receiving a display sync signal for updating the frame per second, the electronic device 501 may receive image data through the image sensor (e.g., the image sensor 383 of FIG. 3A and/or the image sensor 583 of FIG. 5) and receive the optical signal through the light receiving unit (e.g., the light receiving unit 385b of FIG. 3A and/or the light receiving unit 585b) of the optical sensor (e.g., the optical sensor 385 of FIG. 3A and/or the optical sensor 585 of FIG. 5) for compensating for the image data, in at least one display off time of the at least one duty cycle used as the first time period.

According to an embodiment of the disclosure, the electronic device 501 may receive an optical signal through the light receiving unit of the optical sensor while receiving the image data through the image sensor during the first time period and may compensate for the image data received through the image sensor 583 using an auto white balance (AWB) algorithm based on the received optical signal.

According to an embodiment of the disclosure, upon identifying a request for the operation of the camera when the display sync signal is received, the electronic device 501 may receive image data through the image sensor in the first display off time of the first duty cycle among the at least one duty cycle used as the first time period and receive the optical signal through the light receiving unit of the optical sensor for compensating for the image data. The electronic device 501 may receive the image data through the image sensor during a time shorter than the first display off time and receive the optical signal through the light receiving unit of the optical sensor for compensating for the image data.

According to an embodiment of the disclosure, the electronic device 501 may determine the time of performing the operation of the camera for receiving the image data through the image sensor based on the shutter speed time of the camera operation information (e.g., the frame rate (FPS) of the camera, shutter speed time, and IOS). If an additional time for the operation of the camera is needed after the operation of the camera is performed in the first display off time of the first duty cycle among the at least one duty cycle used as the first time period, the electronic device 501 may receive the image data through the image sensor in the second display off time of the second duty cycle among the at least one duty cycle used as the first time period and receive the optical signal through the light receiving unit of the optical sensor 585 for compensating for the image data. The electronic device 501 may receive the image data through the image sensor during a time shorter than the second display off time and receive the optical signal through the light receiving unit of the optical sensor for compensating for the image data.

The electronic device 501 may identify reception of the sync signal in operation 903. If identifying a request for the operation of the optical sensor in operation 909, the electronic device 501 may perform the operation of the optical sensor in the display off time of the last duty cycle included in the second time period using the first module (e.g., the first module 380 of FIG. 3A and/or the first module 580 of FIG. 8) in operation 911. When the display screen of the electronic device needs to be turned off, the electronic device 501 may identify it as a request for the operation of the optical sensor (e.g., the proximity sensor). For example, when a call needs to be performed using a receiver of the electronic device or when it needs to be determined whether the electronic device is positioned in a space, e.g., a pocket of the clothes or a bag, with the electronic device set as always on display (AOD), the electronic device may identify it as a request for the operation of the optical sensor (e.g., the proximity sensor). According to an embodiment of the disclosure, when receiving the display sync signal, if identifying the request for the operation of the optical sensor, the electronic device 501 may measure the amount of the light emitted from the light emitting unit of the optical sensor, reflected by a target object, and received by the light receiving unit during the display off time of the last duty cycle used as the second time period, performing the operation of the optical sensor of detecting whether the target object is near the electronic device 501 or whether the target object comes closer to or farther away from the electronic device 501.

Figure 10:
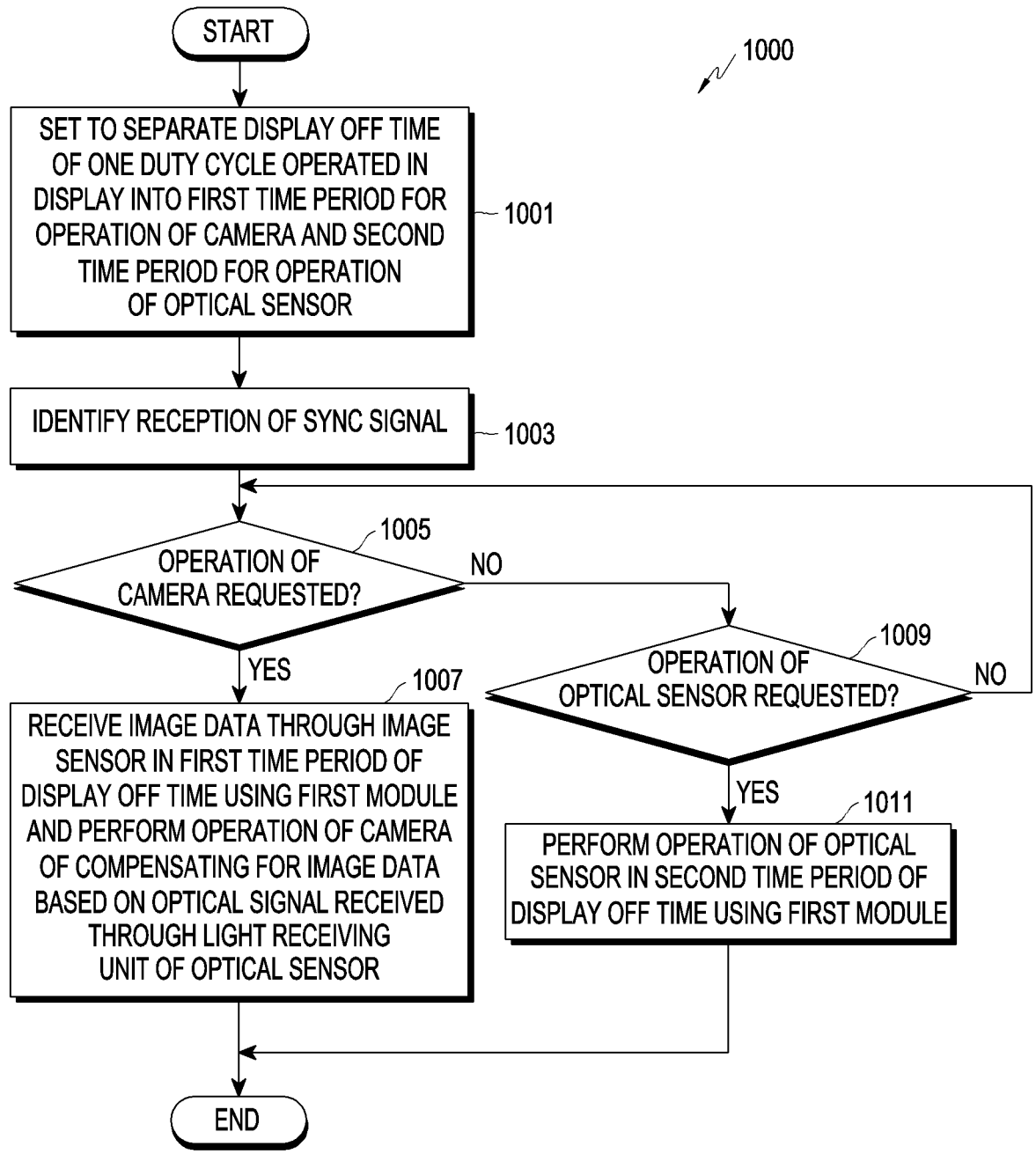
FIG. 10 is a flowchart illustrating operations of a camera and operations of an optical sensor using a first module in an electronic device according to an embodiment of the disclosure.

FIG. 10 is a flowchart 1000 illustrating operations of a camera and operations of an optical sensor using a first module in an electronic device according to an embodiment of the disclosure. The operations of the camera and the operation of the optical sensor may include operations 1001 to 1011. According to an embodiment of the disclosure, at least one of operations 1001 to 1011 may be omitted or changed in order or may add other operations. The operation of the camera and the operation of the optical sensor may be performed by the electronic device 101 of FIG. 1, the processor 120 of FIG. 1, the electronic device 501 of FIG. 5, or the processor 520 of FIG. 5.

Referring to FIG. 10, in operation 1001, the electronic device 501 may divide the display off time of one duty cycle operated in the display into a first time period for the operation of the camera and a second time period for the operation of the optical sensor.

According to an embodiment of the disclosure, in a case where the first module 580 (e.g., the first module 380 of FIG. 3A and/or the first module 580 of FIG. 5) is disposed under a partial area (e.g., the partial area 363a of FIG. 3A) set to have the transmittance which allows the operation of the camera and the operation of the optical sensor in the display (e.g., the display panel 363 of FIG. 3A), the electronic device 501 may divide the display off time of one duty cycle operated in the display into the first time period for the operation of the camera and the second time period for the operation of the optical sensor.

According to an embodiment of the disclosure, the electronic device 501 may set a time from the time when the display off starts to a time, a predetermined time before the time when the next frame is received, to be used as the first time period, and set the predetermined time to be used as the second time period. The predetermined time may denote the time set for the operation of the optical sensor. For example, the predetermined time may be the time set for the operation of the optical sensor, e.g., 2 ms.

According to an embodiment of the disclosure, when one duty cycle is operated in the display during the time to output one frame, the electronic device 501 may detect the start time ($t_{PS\_delay}$) of the second time period through Equation 1 above.

The electronic device 501 may identify reception of a sync signal in operation 1003. If identifying a request for the operation of the camera in operation 1005, the electronic device 501 may receive image data through the image sensor (e.g., the image sensor 383 of FIG. 3A and/or the image sensor 583 of FIG. 5) and perform the operation of the camera of compensating for the image data based on the optical signal received through the light receiving unit (e.g., the light receiving unit 385b of FIG. 3A or the light receiving unit 585 of FIG. 5) of the optical sensor (e.g., the optical sensor 385 of FIG. 3A and/or the optical sensor 585 of FIG. 5), in the first time period of the display off time using the first module (e.g., the first module 380 of FIG. 3A or the first module 580 of FIG. 8) in operation 1007.

According to an embodiment of the disclosure, the electronic device 501 may execute a camera application and identify a request for reception of the image data through the image sensor, as a request for the operation of the camera.

According to an embodiment of the disclosure, upon identifying a request for the operation of the camera when receiving a display sync signal for updating the frame per second, the electronic device 501 may receive image data through the image sensor (e.g., the image sensor 383 of FIG. 3A and/or the image sensor 583 of FIG. 5) and receive the optical signal through the light receiving unit (e.g., the light receiving unit 385b of FIG. 3A and/or the light receiving unit 585b) of the optical sensor (e.g., the optical sensor 385 of FIG. 3A and/or the optical sensor 585 of FIG. 5) for compensating for the image data, during the time from the time when the display off starts to the time, a predetermined time before the time of reception of the next frame, used as the first time period.

According to an embodiment of the disclosure, the electronic device 501 may receive an optical signal through the light receiving unit of the optical sensor while receiving the image data through the image sensor during the first time period and may compensate for the image data received through the image sensor 583 using an auto white balance (AWB) algorithm based on the received optical signal.

The electronic device 501 may identify reception of the sync signal in operation 1003. If identifying a request for the operation of the optical sensor in operation 1009, the electronic device 501 may perform the operation of the optical sensor in the second time period of the display off time using the first module (e.g., the first module 380 of FIG. 3A and/or the first module 580 of FIG. 8) in operation 1011. When the display screen of the electronic device needs to be turned off, the electronic device 501 may identify it as a request for the operation of the optical sensor (e.g., the proximity sensor). For example, when a call needs to be performed using a receiver of the electronic device or when it needs to be determined whether the electronic device is positioned in a space, e.g., a pocket of the clothes or a bag, with the electronic device set as always on display (AOD), the electronic device may identify it as a request for the operation of the optical sensor (e.g., the proximity sensor). According to an embodiment of the disclosure, if identifying a request for the operation of the optical sensor when receiving a display sync signal, the electronic device 501 may measure the amount of the light, emitted from the light emitting unit (e.g., the light emitting unit 385a of FIG. 3A and/or the light emitting unit 585a of FIG. 5) of the optical sensor (e.g., the optical sensor 385 of FIG. 3A and/or the optical sensor 585 of FIG. 5), reflected by the target object, and received by the light receiving unit (e.g., the light receiving unit 385b of FIG. 3A and/or the light receiving unit 585b of FIG. 5), and perform the operation of the optical sensor of detecting whether there is the target object near the electronic device 501 or whether the target object comes closer to or farther away from the electronic device 501, during the predetermined time used as the second time period.

Figure 11:
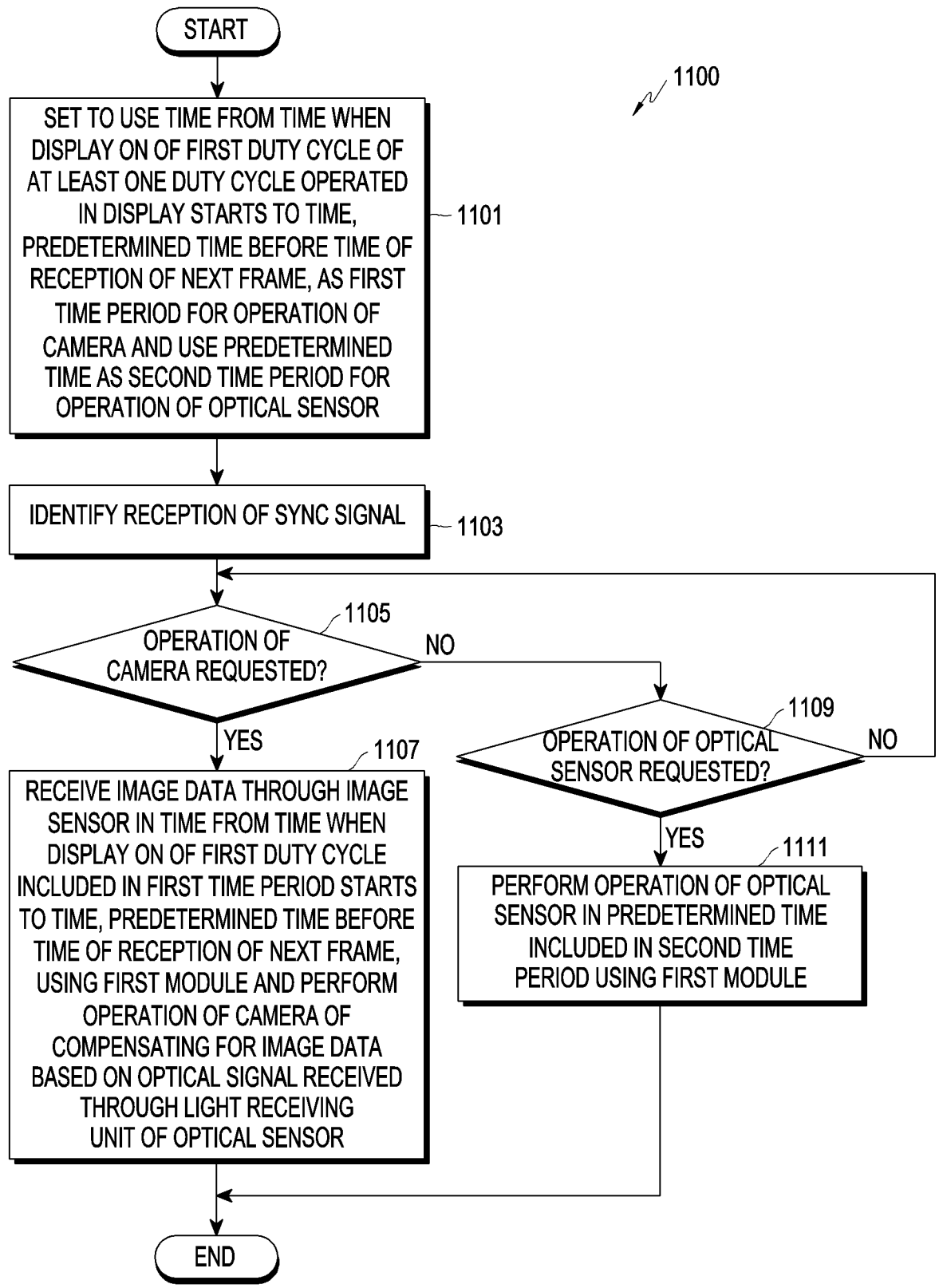
FIG. 11 is a flowchart illustrating operations of a camera and operations of an optical sensor using a first module in an electronic device according to an embodiment of the disclosure.

FIG. 11 is a flowchart 1100 illustrating operations of a camera and operations of an optical sensor using a first module in an electronic device according to an embodiment of the disclosure. The operations of the camera and the operation of the optical sensor may include operations 1101 to 1111. According to an embodiment of the disclosure, at least one of operations 1101 to 1111 may be omitted or changed in order or may add other operations. The operation of the camera and the operation of the optical sensor may be performed by the electronic device 101 of FIG. 1, the processor 120 of FIG. 1, the electronic device 501 of FIG. 5, or the processor 520 of FIG. 5.

Referring to FIG. 11, in operation 1101, the electronic device 501 may set the time from the time when the display on of the first duty cycle of at least one duty cycle operated in the display starts to the time, a predetermined time before the time of reception of the next frame, as the first time period for the operation of the camera and set the predetermined time as the second time period for the operation of the optical sensor.

According to an embodiment of the disclosure, in the case where the first module (e.g., the first module 380 of FIGS. 3B to 3D and/or the first module 580 of FIG. 5) is disposed under the predetermined area (e.g., the predetermined area 363b of FIGS. 3A to 3D) formed as a hole in the display (e.g., the display panel 363 of FIGS. 3B to 3D), the electronic device 501 may set a time from the time when the display on of the first duty cycle operated in the display starts to a time, a predetermined time before the time of reception of the next frame, to be used as the first time period and set the predetermined time to be used as the second time period.

According to an embodiment of the disclosure, since there is no influence of the image output from the display, the electronic device 501 may perform the operation of the camera during the time from the time when the display on of the first duty cycle starts to the time, the predetermined time before the time of reception of the next frame, included in the first time period.

According to an embodiment of the disclosure, the predetermined time included in the second time period may be a time set for the operation of the optical sensor, e.g., 2 ms.

According to an embodiment of the disclosure, the predetermined time included as the second time period may be included in the display off time of the last duty cycle among at least one duty cycle operated in the display.

According to an embodiment of the disclosure, when one duty cycle is operated in the display during the time to output one frame, the electronic device 501 may detect the start time ($t_{PS\_delay}$) of the second time period through Equation 2 above.

The electronic device 501 may identify reception of a sync signal in operation 1103. If identifying a request for the operation of the camera in operation 1105, the electronic device 501 may receive image data through the image sensor and perform the operation of the camera of compensating for the image data based on the optical signal received through the light receiving unit (e.g., the light receiving unit 385b of FIG. 3A or the light receiving unit 585 of FIG. 5) of the optical sensor (e.g., the optical sensor 385 of FIG. 3A and/or the optical sensor 585 of FIG. 5), in the time from the time when the display on of the first duty cycle included in the first time period starts to the time, a predetermined time before the time of reception of the next frame, using the first module (e.g., the first module 380 of FIGS. 3A to 3D and/or the first module 580 of FIG. 8) in operation 1107.

According to an embodiment of the disclosure, the electronic device 501 may execute a camera application and identify a request for reception of the image data through the image sensor, as a request for the operation of the camera.

According to an embodiment of the disclosure, the electronic device 501 may determine the time of performing the operation of the camera for receiving the image data through the image sensor 583 based on the shutter speed time of the camera operation information (e.g., the frame rate (FPS) of the camera, shutter speed, and IOS). The electronic device 501 may receive image data through the image sensor (e.g., the image sensor 383 of FIGS. 3B to 3D and/or the image sensor 583 of FIG. 5) and receive the optical signal through the light receiving unit of the optical sensor for compensating for the image data, in the display on time and the display off time of at least one duty cycle included in the first time period.

According to an embodiment of the disclosure, the electronic device 501 may receive an optical signal through the light receiving unit of the optical sensor while receiving the image data through the image sensor during the first time period and may compensate for the image data received through the image sensor 583 using an auto white balance (AWB) algorithm based on the received optical signal.

The electronic device 501 may identify reception of the sync signal in operation 1103. If identifying a request for the operation of the optical sensor in operation 1109, the electronic device 501 may perform the operation of the optical sensor during the predetermined time included in the second time period using the first module (e.g., the first module 380 of FIGS. 3B to 3D or the first module 580 of FIG. 8) in operation 1111. When the display screen of the electronic device needs to be turned off, the electronic device 501 may identify it as a request for the operation of the optical sensor (e.g., the proximity sensor). For example, when a call needs to be performed using a receiver of the electronic device or when it needs to be determined whether the electronic device is positioned in a dark space, e.g., a pocket of the clothes or a bag, with the electronic device set as always on display (AOD), it may be identified as a request for the operation of the optical sensor (e.g., the proximity sensor).

According to an embodiment of the disclosure, when receiving the display sync signal, if identifying the request for the operation of the optical sensor, the electronic device 501 may measure the amount of the light emitted from the light emitting unit of the optical sensor, reflected by a target object, and received by the light receiving unit during the predetermined time used as the second time, performing the operation of the optical sensor of detecting whether the target object is near the electronic device 501 or whether the target object comes closer to or farther away from the electronic device 501.

According to various embodiments of the disclosure, a method for performing an operation of a camera and an operation of an optical sensor using one module in an electronic device may comprise dividing a time to output one frame into a first time period for the operation of the camera and a second time period for the operation of the optical sensor, performing the operation of the camera in the first time period using a first module of the electronic device, and performing the operation of the optical sensor in the second time period using the first module. The first module may include an image sensor, an infrared filter, and the optical sensor disposed close to the image sensor and inside an area of the infrared filter.

According to various embodiments of the disclosure, the infrared filter may include a wavelength band capable of receiving an infrared optical signal in the optical sensor.

According to various embodiments of the disclosure, the performing of the operation of the camera may include receiving an optical signal through a light receiving unit of the optical sensor during a time of receiving image data through the image sensor and compensating for the image data received from the image sensor based on the received optical signal, in the first time period.

According to various embodiments of the disclosure, the time of receiving the image data through the image sensor in the first time period may be determined according to a shutter speed time.

According to various embodiments of the disclosure, the method may further comprise, in a case where the first module is disposed under a predetermined area set to have a transmittance capable of the operation of the camera and the operation of the optical sensor in the display, if a plurality of duty cycles are operated in the display during the time to output the one frame, using at least one remaining duty cycle, except for a last duty cycle among the plurality of duty cycles, as the first time period and using the last duty cycle as the second time period.

According to various embodiments of the disclosure, the method may further comprise, if identifying a request for the operation of the camera when a sync signal is received, performing the operation of the camera of receiving image data through the image sensor in at least one display off time of the at least one duty cycle used as the first time period, and if identifying a request for the operation of the optical sensor when the sync signal is received, performing the operation of the optical sensor in a display off time of the last duty cycle used as the second time period.

According to various embodiments of the disclosure, the method may further comprise, in a case where the first module is disposed under a predetermined area set to have a transmittance capable of the operation of the camera and the operation of the optical sensor in the display, if one duty cycle is operated in the display during the time to output the one frame, separating a display off time of the one duty cycle into the first time period and the second time period.

According to various embodiments of the disclosure, the method may further comprise using a time from a time when the display off starts to a time, a predetermined time before a time of reception of a next frame, as the first time period and using the predetermined time as the second time period, in the display off time of the one duty cycle.

According to various embodiments of the disclosure, the method may further comprise, in a case where the first module is disposed under a predetermined area formed as a hole in the display, if at least one duty cycle is operated in the display during the time to output the one frame, using a time from a time when a display on of a first duty cycle starts to a time, a predetermined time before a time of reception of a next frame, as the first time period and using the predetermined time as the second time period.

According to various embodiments of the disclosure, the predetermined time may be included in a display off time of a last duty cycle among the at least one duty cycle.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101 or the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a first module for an operation of a camera and an operation of an optical sensor disposed under the display;
   memory storing instructions; and
   at least one processor,
   wherein the first module includes:
      an image sensor,
      an infrared filter, and
      the optical sensor disposed close to the image sensor and inside an area of the infrared filter, the optical sensor including an infrared light emitting unit disposed close to the image sensor and inside an area of the infrared filter, and
   wherein the instructions, when executed by the at least one processor individually or collectively, cause the electronic device to:
      separate a time to output one frame into a first time period for the operation of the camera and a second time period for the operation of the optical sensor,
      perform the operation of the camera in the first time period using the first module, and
      perform the operation of the optical sensor in the second time period using the first module.

2. The electronic device of claim 1, wherein the infrared filter is configured to include a wavelength band capable of receiving an infrared optical signal in the optical sensor.

3. The electronic device of claim 1,
   wherein the instructions, when executed by the at least one processor individually or collectively, further cause the electronic device to:
   receive an optical signal through a light receiving unit of the optical sensor during a time of receiving image data through the image sensor, and
   compensate for the image data received from the image sensor based on the received optical signal, in the first time period.

4. The electronic device of claim 3,
   wherein the instructions, when executed by the at least one processor individually or collectively, further cause the electronic device to:
   determine the time of receiving the image data through the image sensor in the first time period, according to a shutter speed time.

5. The electronic device of claim 1,
   wherein in a case where the first module is disposed under a predetermined area set to have a transmittance capable of the operation of the camera and the operation of the optical sensor in the display, and
   wherein the instructions, when executed by the at least one processor individually or collectively, further cause the electronic device to:
      if a plurality of duty cycles are operated in the display during the time to output the one frame, use at least one remaining duty cycle, except for a last duty cycle among the plurality of duty cycles, as the first time period, and
      use the last duty cycle as the second time period.

6. The electronic device of claim 5,
   wherein the instructions, when executed by the at least one processor individually or collectively, further cause the electronic device to:
   if identifying a request for the operation of the camera when a sync signal is received, perform the operation of the camera of receiving image data through the image sensor in at least one display off time of the at least one remaining duty cycle used as the first time period, and
   if identifying a request for the operation of the optical sensor when the sync signal is received, perform the operation of the optical sensor in a display off time of the last duty cycle used as the second time period.

7. The electronic device of claim 1,
   wherein, in a case where the first module is disposed under a predetermined area set to have a transmittance capable of the operation of the camera and the operation of the optical sensor in the display, and
   wherein the instructions, when executed by the at least one processor individually or collectively, further cause the electronic device to:

if one duty cycle is operated in the display during the time to output the one frame, separate a display off time of the one duty cycle into the first time period and the second time period.

8. The electronic device of claim 7,
wherein the instructions, when executed by the at least one processor individually or collectively, further cause the electronic device to:
use a time from a time when the display off starts to a time, a predetermined time before a time of reception of a next frame, as the first time period, and
use the predetermined time as the second time period, in the display off time of the one duty cycle.

9. The electronic device of claim 1,
wherein in a case where the first module is disposed under a predetermined area formed as a hole in the display, and
wherein the instructions, when executed by the at least one processor individually or collectively, further cause the electronic device to:
if at least one duty cycle is operated in the display during the time to output the one frame, use a time from a time when a display on of a first duty cycle starts to a time, a predetermined time before a time of reception of a next frame, as the first time period, and
use the predetermined time as the second time period.

10. The electronic device of claim 9, wherein the predetermined time is configured to be included in a display off time of a last duty cycle among the at least one duty cycle.

11. A method for performing an operation of a camera and an operation of an optical sensor using one module in an electronic device, the method comprising:
dividing a time to output one frame into a first time period for the operation of the camera and a second time period for the operation of the optical sensor;
performing the operation of the camera in the first time period using a first module of the electronic device; and
performing the operation of the optical sensor in the second time period using the first module,
wherein the first module includes:
an image sensor,
an infrared filter, and
the optical sensor disposed close to the image sensor and inside an area of the infrared filter, the optical sensor including an infrared light emitting unit disposed close to the image sensor and inside an area of the infrared filter.

12. The method of claim 11, wherein the infrared filter includes a wavelength band capable of receiving an infrared optical signal in the optical sensor.

13. The method of claim 11, wherein the performing of the operation of the camera includes:
receiving an optical signal through a light receiving unit of the optical sensor during a time of receiving image data through the image sensor; and
compensating for the image data received from the image sensor based on the received optical signal, in the first time period.

14. The method of claim 13, wherein the time of receiving the image data through the image sensor in the first time period is determined according to a shutter speed time.

15. The method of claim 11, further comprising:
in a case where the first module is disposed under a predetermined area set to have a transmittance capable of the operation of the camera and the operation of the optical sensor in a display, if a plurality of duty cycles are operated in the display during the time to output the one frame, using at least one remaining duty cycle, except for a last duty cycle among the plurality of duty cycles, as the first time period; and
using the last duty cycle as the second time period.

16. The method of claim 15, further comprising:
if identifying a request for the operation of the camera when a sync signal is received, performing the operation of the camera of receiving image data through the image sensor in at least one display off time of the at least one remaining duty cycle used as the first time period; and
if identifying a request for the operation of the optical sensor when the sync signal is received, performing the operation of the optical sensor in a display off time of the last duty cycle used as the second time period.

17. The method of claim 11, further comprising:
in a case where the first module is disposed under a predetermined area set to have a transmittance capable of the operation of the camera and the operation of the optical sensor in a display, if one duty cycle is operated in the display during the time to output the one frame, separating a display off time of the one duty cycle into the first time period and the second time period.

18. The method of claim 17, further comprising:
using a time from a time when the display off starts to a time, a predetermined time before a time of reception of a next frame, as the first time period; and
using the predetermined time as the second time period, in the display off time of the one duty cycle.

19. The method of claim 11, further comprising:
in a case where the first module is disposed under a predetermined area formed as a hole in a display, if at least one duty cycle is operated in the display during the time to output the one frame, using a time from a time when a display on of a first duty cycle starts to a time, a predetermined time before a time of reception of a next frame, as the first time period; and
using the predetermined time as the second time period.

20. The method of claim 19, wherein the predetermined time is included in a display off time of a last duty cycle among the at least one duty cycle.

* * * * *